(12) United States Patent
Ukai et al.

(10) Patent No.: US 10,771,772 B2
(45) Date of Patent: Sep. 8, 2020

(54) IMAGE DISPLAY DEVICE

(71) Applicant: Hitachi-LG Data Storage, Inc., Tokyo (JP)

(72) Inventors: Ryuji Ukai, Tokyo (JP); Yoshiho Seo, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 104 days.

(21) Appl. No.: 16/059,138

(22) Filed: Aug. 9, 2018

(65) Prior Publication Data

US 2019/0068959 A1     Feb. 28, 2019

(30) Foreign Application Priority Data

Aug. 30, 2017   (JP) ................. 2017-165366

(51) Int. Cl.
| | |
|---|---|
| *H04N 13/332* | (2018.01) |
| *H04N 13/167* | (2018.01) |
| *G02B 27/01* | (2006.01) |
| *G02B 6/122* | (2006.01) |
| *G02F 1/1343* | (2006.01) |
| *H04N 13/398* | (2018.01) |

(Continued)

(52) U.S. Cl.
CPC .......... *H04N 13/332* (2018.05); *G02B 6/122* (2013.01); *G02B 27/0172* (2013.01); *G02F 1/1343* (2013.01); *H04N 13/167* (2018.05); *H04N 13/324* (2018.05); *H04N 13/344* (2018.05); *H04N 13/398* (2018.05); *G02B 2027/0178* (2013.01); *G09G 2310/08* (2013.01); *G09G 2330/021* (2013.01)

(58) Field of Classification Search
CPC .. H04N 13/332; H04N 13/398; H04N 13/344; H04N 13/324; H04N 13/167; G02B 27/0172; G02B 6/122; G02B 2027/0178; G02B 2027/014; G02B 27/017; G02F 1/1343; G09G 2310/08; G09G 2330/021; G09G 3/20
See application file for complete search history.

(56) References Cited

U.S. PATENT DOCUMENTS 9,591,293 B2 *   3/2017  Jarvenpaa ............ H04N 13/324
2012/0206443 A1  8/2012  Kimura et al.
(Continued)

FOREIGN PATENT DOCUMENTS

JP    2012-168221 A    9/2012

*Primary Examiner* — Bryan Earles
(74) *Attorney, Agent, or Firm* — Mattingly & Malur, PC

(57) ABSTRACT

According to the present invention, in an image display device that displays two images in parallel, a peak current for light source driving and continuation of a peak current are suppressed without reducing luminance of a display image. An image display device includes a light source unit, two panel units, and a timing control unit. A period of one frame of an image displayed by each panel unit has a standby period in which the panel unit is not illuminated by the light source unit for image generation and a lighting period in which the panel unit is illuminated by the light source unit. The timing control unit controls an operation timing such that the periods of one frame of the images displayed by the respective panel units overlap, and frame start times of the periods are shifted from each other by a predetermined delay time.

13 Claims, 15 Drawing Sheets

(51) Int. Cl.
*H04N 13/344* (2018.01)
*H04N 13/324* (2018.01)

(56) References Cited

U.S. PATENT DOCUMENTS

2015/0379772 A1* 12/2015 Hoffman ............... G06T 19/006
 345/633
2016/0097931 A1* 4/2016 Takahota ............... G02B 27/01
 345/690

* cited by examiner

WHEN Tgreen ≥ Twait

WHEN LEFT AND RIGHT PANELS DO NOT DISPLAY SAME COLOR CONSECUTIVELY

WHEN PANEL STANDBY PERIOD Twait
DIFFER BETWEEN COLORS

IMAGE DISPLAY DEVICE

CLAIM OF PRIORITY

The present application claims priority from Japanese patent application serial No. JP 2017-165366, filed on Aug. 30, 2017, the content of which is hereby incorporated by reference into this application.

BACKGROUND OF THE INVENTION

(1) Field of the Invention

The present invention relates to an image display device such as a head mounted display.

(2) Description of the Related Art

In the past, image display devices called head mounted displays (hereinafter abbreviated as "HMDs") worn a head of a user for use have been known. The user can recognize images such as videos or still images displayed by the HMD by visual sensation of the eyes and acquire various kinds of information.

There is a demand to increase luminance of an image to be displayed by an HMD so that HMDs can be used in various usage environments. In order to increase the luminance of the image, it is necessary to cause a large current to flow to a light source. Particularly, in binocular HMDs, if an image displayed on each of the left and right eyes is generated in a state in which the light sources are turned on at the same time, a peak of a current for light source driving becomes very large. In order to generate a large peak current or maintain a large peak current, a large power source is necessary, and thus the size of the HMD increases.

In this regard, a head mounted display device capable of suppressing power consumption by alternately switching left and right display images at intervals of image frames is disclosed in JP 2012-168221 A.

SUMMARY OF THE INVENTION

In order for the HMD to display an image, a period in which image data is written on a panel of the HMD is necessary, and thus there is a period in which light is unable to be output from the light source. Further, in order to miniaturize the HMD, it is preferable to perform display by field sequential driving using a small panel with no color filter. In this case, since image data is written twice or more in a period of one frame, a period (light emission duty) during which the light source emits light is small. On the other hand, even when an image is displayed by a panel with a color filter or the like instead of field sequential driving, there are cases in which the light emission duty is decreased in order to prevent bleeding of moving images. If the light emission duty of the light source is decreased as described above, in order to secure the luminance of the image, it is necessary to cause a large current to flow to the light source. Particularly, in the binocular HMD, since images to be displayed on the left and right eyes are generated by turning on the respective light sources, the peak of the current for the light source driving becomes very large.

In the head mounted display device disclosed in JP 2012-168221 A, only either of the right eye image and the left eye image is displayed during one frame of an image to be displayed. According to this, lighting of the light source is switched alternately at intervals of frames, and power consumption can be suppressed. However, since only either of the right eye image and the left eye image is displayed during one frame, there is a problem in that the luminance of the display image is lower than in a case in which both the right eye image and the left eye image are displayed during one frame.

It is an object of the present invention to suppress the peak current for the light source driving or continuation of the peak current without reducing luminance of a display image in an image display device that displays first and second images in parallel.

The present invention provides an image display device that displays a first image and a second image in parallel, including: a light source unit; a first panel unit which is illuminated by light emitted from the light source unit, and generates and displays the first image; a second panel unit which is illuminated by light emitted from the light source unit and generates and displays the second image; and a timing control unit that controls operation timings of the light source unit, the first panel unit, and the second panel unit, wherein a period of one frame of the first image displayed by the first panel unit includes a standby period in which the first panel unit is not illuminated by the light from the light source unit for image generation preparation and a lighting period in which the first panel unit is illuminated by the light from the light source unit, and a period of one frame of the second image displayed by the second panel unit includes a standby period in which the second panel unit is not illuminated by the light from the light source unit for image generation preparation and a lighting period in which the second panel unit is illuminated by the light from the light source unit. The timing control unit performs control such that the period of one frame of the first image displayed by the first panel unit and the period of one frame of the second image displayed by the second panel unit overlap and frame start times of the respective periods are shifted from each other by a predetermined delay time Td.

According to the present invention, it is possible to provide an image display device using a small sized power source by displaying both a first image and a second image in a period of one frame and suppressing the peak current for the light source driving or continuation of the peak current while displaying a high luminance image.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Hereinafter, embodiments of the present invention will be described in detail with reference to the appended drawings. In the following description, a binocular head mounted display (HMD) will be described as an image display device, but any image display device that displays two images in parallel is included in the scope of the present invention.

First Embodiment

Figure 1A:
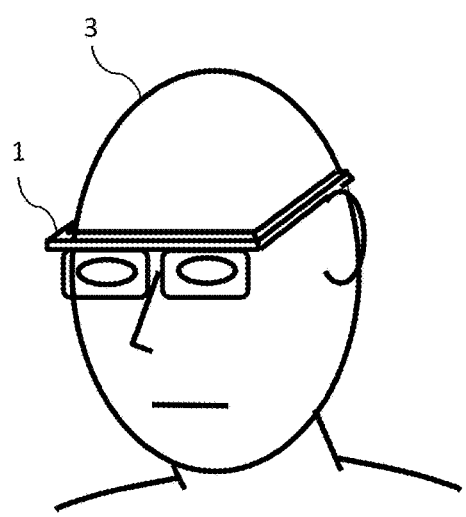
FIGS. 1A and 1B are diagrams illustrating a usage form and a schematic configuration of a binocular HMD (a first embodiment)
Figure 1B:
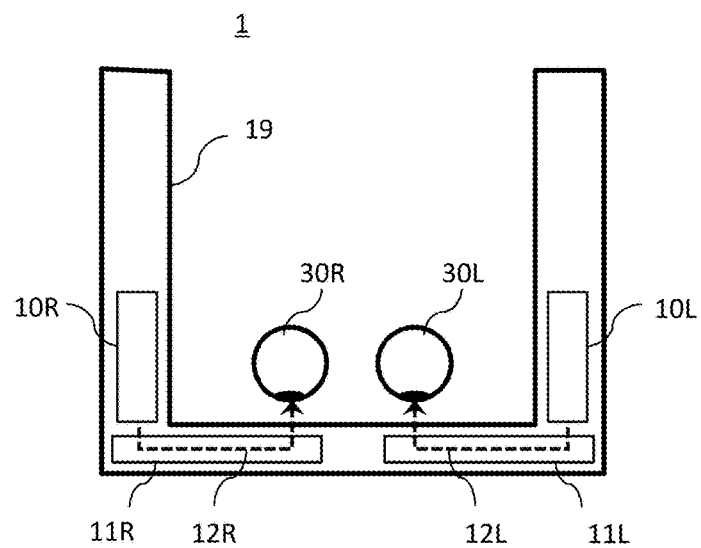

FIG. 1A and FIG. 1B are diagrams illustrating a usage form and a schematic configuration of a binocular HMD. FIG. 1A illustrates a usage form of a binocular HMD 1. A user 3 wears the binocular HMD 1 on the head and visually recognizes left and right images displayed by the binocular HMD 1.

FIG. 1B is a schematic configuration diagram of the binocular HMD 1 viewed from above the user 3. The binocular HMD 1 includes a right eye image display unit 10R and a left eye image display unit 10L, a right eye wave guide unit 11R and a left eye wave guide unit 11L, and a holding unit 19. The holding unit 19 is a housing for holding all or some of constituent parts of the binocular HMD 1. The user 3 wears holding unit 19 on the head and uses the binocular HMD 1.

The right eye image display unit 10R and the left eye image display unit 10L generate right eye and left eye images, respectively, and emit image light 12R and image light 12L. The emitted image light 12R and image light 12L are guided to a right eye 30R of the user 3 and a left eye 30L of the user by a right eye wave guide unit 11R and a left eye wave guide unit 11L, respectively. A part or all of each of the image light 12R and the image light 12L guided to the right eye 30R of the user 3 and the left eye 30L of the user reach the retina of the user 3 (not illustrated).

Hereinafter, in a case in which it is not necessary to distinguish left and right in the right eye image display unit 10R and the left eye image display unit 10L, the right eye wave guide unit 11R and the left eye wave guide unit 11L, the image light 12R and the image light 12L, and the right eye 30R of the user and the left eye 30L of the user, they are referred to collectively as an image display unit 10, a wave guide unit 11, image light 12, an eye 30 of the user.

Figure 2:
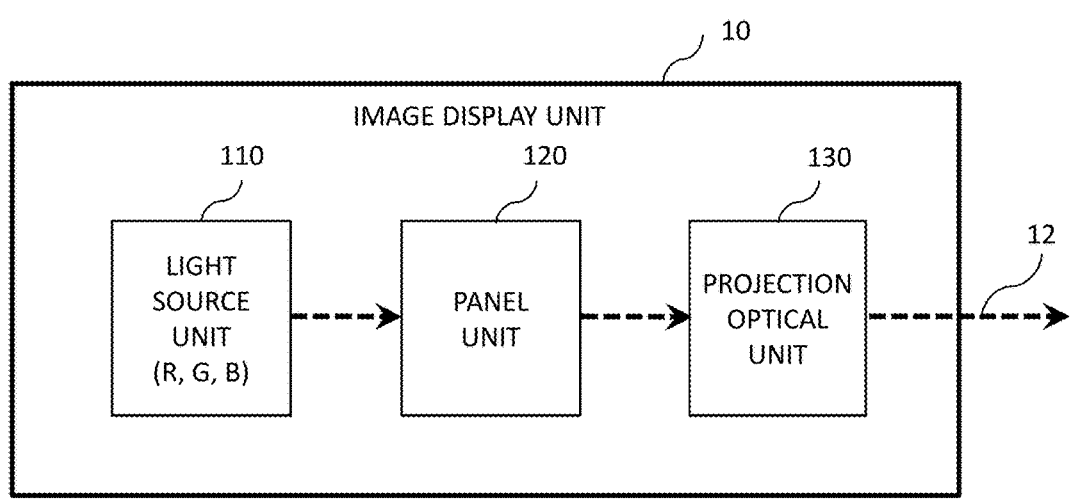
FIG. 2 is a diagram illustrating a configuration example of an image display unit 10.

FIG. 2 is a diagram illustrating a configuration example of the image display unit 10. The image display unit 10 includes a light source unit 110, a panel unit 120, and a projection optical unit 130.

The light source unit 110 emits light by which the image display unit 10 generates an image. The light source unit 110 includes a light source that emits red (R) light, a light source that emits green (G) light, and a light source that emits blue (B) light, and displays a full color image through a field sequential scheme by turning on the light sources sequentially. The light emitted from the light source unit 110 enters the panel unit 120. The panel unit 120 includes, for example, a liquid crystal panel, and modulates the light incident from the light source unit 110 on the basis of a video signal and generates an image. Here, the panel unit 120 does not include a filter or the like for converting colors, and generates an image having substantially the same color as the incident light. The light of the image generated by the panel unit 120 enters the projection optical unit 130. The projection optical unit 130 projects the image light incident from the panel unit 120 so that an image is formed at a predetermined position. The image light 12 output from the image display unit 10 is directed to the wave guide unit 11.

Figure 3A:
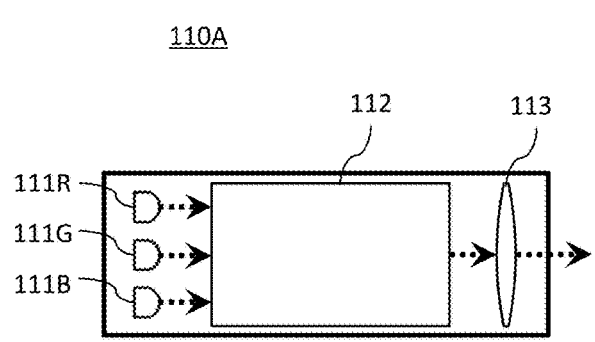
FIGS. 3A and 3B are diagrams illustrating a configuration example of a light source unit 110.
Figure 3B:
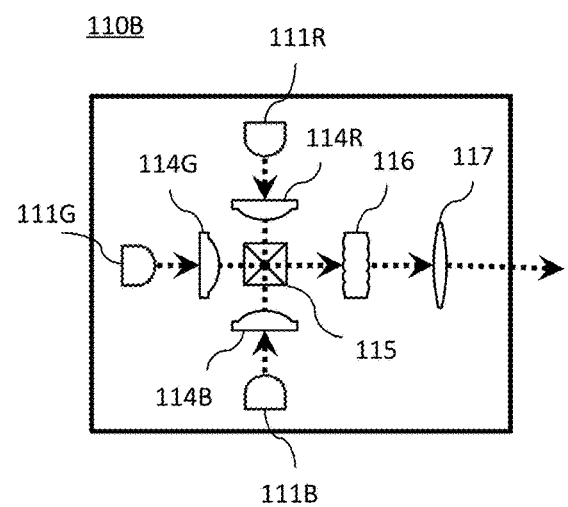

FIGS. 3A and 3B are diagrams illustrating configuration examples of the light source unit 110, and illustrate two configurations here. FIG. 3A illustrates a configuration using a light panel, and a light source unit 110A includes three light sources 111R, 111G, and 111B, a light panel 112, and a lens 113.

The light source 111R emits red light (R light), the light source 111G emits green light (G light), and the light source 111B emits blue light (B light). Each of the three light sources may be mounted in an independent package, or two or more light sources may be integrated and packaged in one package.

Light emitted from any one of the light sources 111R, 111G, and 111B enters the light panel 112. Since the light incident on the light panel 112 is reflected against an inner wall of the light panel 112 twice or more, an illuminance distribution of the light emitted from the light panel 112 becomes substantially uniform. Light emitted from the light panel 112 passes through the lens 113. The lens 113 serves to collect divergent light emitted from the light panel 112. The lens 113 may be constituted by a single lens or a plurality of lenses. With the above configuration, the light source unit 110A can illuminate the panel unit 120 with a substantially uniform illuminance distribution.

FIG. 3B illustrates a configuration using a cross prism, and a light source unit 110B includes three light sources 111R, 111G, and 111B, three light collecting lenses 114R, 114G, and 114B, a cross prism 115, a micro lens array 116, and a lens 117.

The lights emitted from the light sources 111R, 111G, and 111B pass through the light collecting lenses 114R, 114G, and 114B, respectively. The light collecting lens 114R, 114G, and 114B plays a role of converting divergent light emitted from the light source 111R, 111G, and 111B into substantially parallel light. Each of the light collecting lenses 114R, 114G, and 114B may be constituted by a single lens or a plurality of lenses.

The light emitted from the light collecting lens 114R, 114G, and 114B enters the cross prism 115. The cross prism 115 has first to fourth surfaces, and the light emitted from the light collecting lens 114R, 114G, 114B enters the first, second, and third surfaces of the cross prism 115, respectively. The light incident on the cross prism 115 is emitted from the fourth surface of the cross prism 115.

The light emitted from the cross prism 115 passes through the micro lens array 116 and the lens 117. At this time, the micro lens array 116 and the lens 117 are designed and arranged so that respective incident cells (objects) of the micro lens array 116 form an image on the liquid crystal panel in the panel unit 120, and the size of the image formed is substantially equal to the size of a light modulation region in the liquid crystal panel. The lens 117 may be constituted by a single lens or a plurality of lenses. With the above configuration, the light source unit 110B can illuminate the liquid crystal panel in the panel unit 120 with a substantially uniform illuminance distribution.

Figure 4:
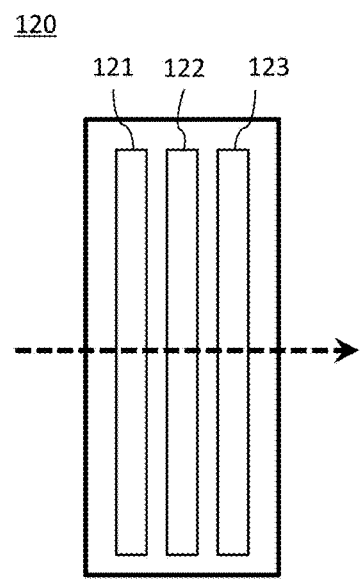
FIG. 4 is a diagram illustrating a configuration example of a panel unit 120.

FIG. 4 is a diagram illustrating a configuration example of the panel unit 120. The panel unit 120 includes a polarizing plate 121, a transmissive liquid crystal panel 122, and a polarizing plate 123.

The light incident on the panel unit 120 from the light source unit 110 first enters the polarizing plate 121. Since the polarizing plate 121 transmits light having polarized light of a specific direction, light that has passed through the polarizing plate 121 has polarized light of a specific direction.

Next, the light that has passed through the polarizing plate 121 enters the liquid crystal panel 122. The liquid crystal panel 122 in the present embodiment does not include a filter or the like for converting colors, and generates an image having substantially the same color as the incident light. The liquid crystal panel 122 includes a liquid crystal layer (not illustrated), a pixel electrode, and an opposite electrode. The liquid crystal layer is sandwiched between the pixel electrode and the opposite electrode, and changes an orientation of liquid crystal molecules in accordance with a voltage applied between the pixel electrode and the opposite electrode. The light incident on the liquid crystal panel 122 enters the liquid crystal layer, and the polarized light rotates in accordance with the orientation of the liquid crystal molecules of the liquid crystal layer and is then emitted from the liquid crystal layer. The light emitted from the liquid crystal layer is emitted from the liquid crystal panel 122.

Then, the light emitted from the liquid crystal panel 122 enters the polarizing plate 123. Light polarized in the same direction as a polarization axis of the polarizing plate 123 passes through the polarizing plate 123. The light emitted from the polarizing plate 123 is emitted from the panel unit 120. By controlling an electrical signal to be applied between the pixel electrode and the opposite electrode, the panel unit 120 can apply intensity modulation to the light incident on the panel unit 120 from the light source unit 110.

In the above example, the panel unit 120 has been described as including the transmissive liquid crystal panel 122, but the present embodiment is not limited thereto. For example, the panel unit 120 may include a reflective liquid crystal panel, or an element in which Micro-Electro Mechanical Systems (MEMSs) with a mirror are arranged on an array may be used.

The light emitted from the panel unit 120 enters the projection optical unit 130. The projection optical unit 130 includes, for example, one or more lenses, and projects light incident from the panel unit 120. For example, the projection optical unit 130 forms the image generated by the panel unit 120 at a predetermined position. The image obtained by the image forming may be a real image or a virtual image. Further, the image forming position may be a finite distance position or an infinite distance. The image display unit 10 outputs the light projected by the projection optical unit 130 as the image light 12.

The image light 12 emitted from the image display unit 10 enters the wave guide unit 11. The wave guide unit 11 guides the image light incident from the image display unit 10 to the eyes 30 of the user.

In the above example, the image display unit 10 includes the projection optical unit 130, but the invention is not limited thereto. For example, the image display unit 10 may not include the projection optical unit 130, and instead, the wave guide unit 11 may have the role of the projection optical unit 130 that projects an image, and both the image display unit 10 and the wave guide unit 11 may have the role of projecting an image.

Figure 5A:
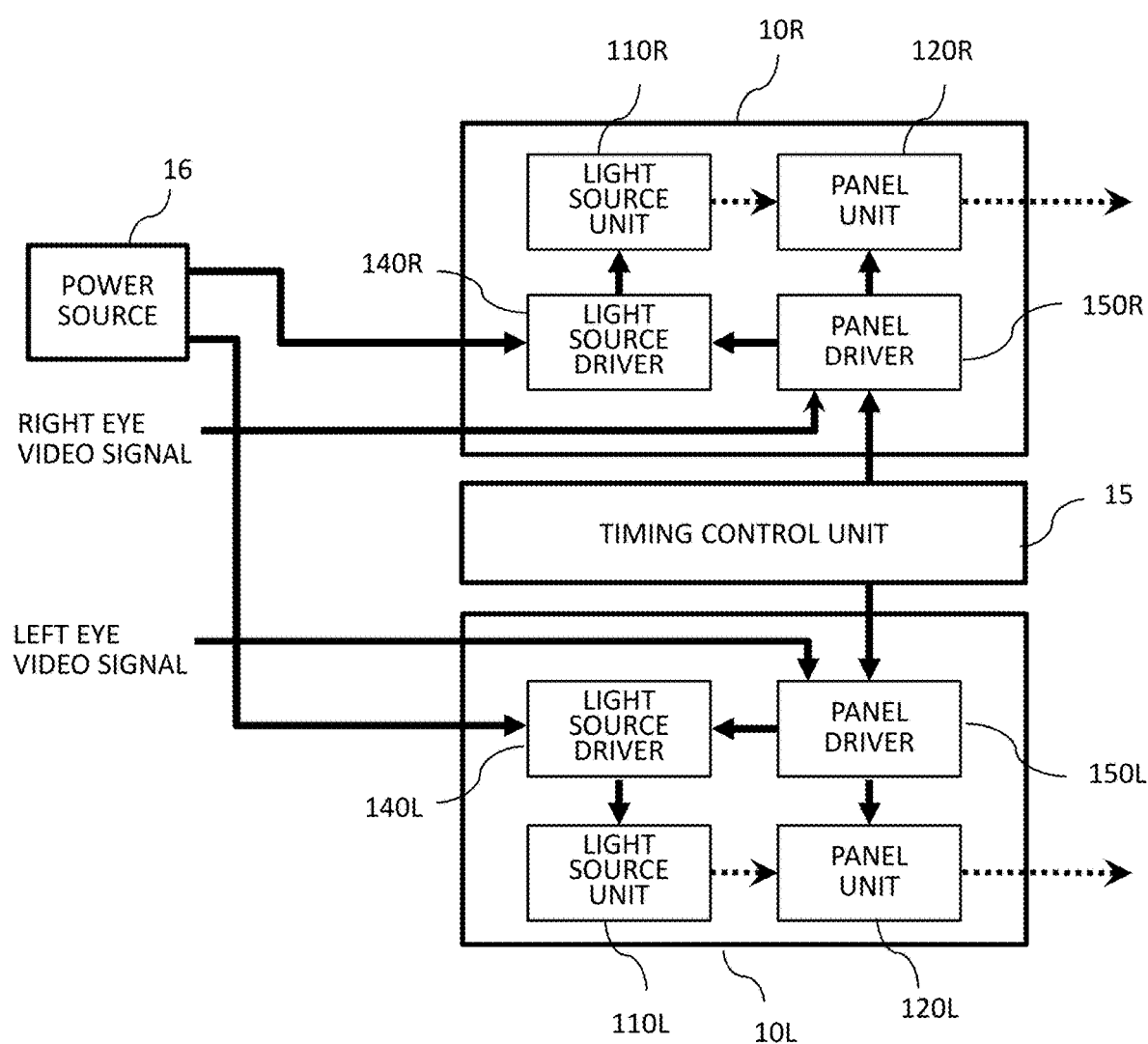
FIG. 5A is a diagram illustrating an example of a control block of a binocular HMD 1.

FIG. 5A is a diagram illustrating an example of a control block of the binocular HMD 1. The binocular HMD 1 includes the right eye image display unit 10R, the left eye image display unit 10L, a timing control unit 15, and a power source 16. The timing control unit 15 controls a timing at which each of the right eye image display unit 10R and the left eye image display unit 10L performs image display of one frame. The power source 16 includes, for example, a rechargeable battery, and supplies electric power to the light source unit 110 R in the right eye image display unit 10R and the light source unit 110 L in the left eye image display unit 10L. The right eye image display unit 10R includes a right eye light source driver 140R and a right eye panel driver 150R, and the left eye image display unit 10L includes a left eye light source driver 140L and a left eye panel driver 150L.

The timing control unit 15 transmits a right eye panel unit drive trigger signal to the right eye panel driver 150R and transmits a left eye panel unit drive trigger signal to the left eye panel driver 150L. At this time, the right eye panel unit drive trigger signal and the left eye panel unit drive trigger signal are transmitted with a time difference therebetween so that a right eye image display and a left eye image display to be described later are shifted by a predetermined time.

The binocular HMD 1 receives a right eye video signal and a left eye video signal via a video signal reception port (not illustrated). Alternatively, the binocular HMD 1 generates the right eye video signal and the left eye video signal through a video signal generating unit (not illustrated). The binocular HMD 1 inputs the received or generated right eye and left eye video signals to the right eye panel driver 150R and the left eye panel driver 150L, respectively. The panel drivers 150R and 150L temporarily store the input video signals.

Hereinafter, since internal operations of the right eye image display unit 10R and the left eye image display unit 10L are similar, the description will proceed without distinguishing them particularly. The panel driver 150 transmits a panel unit drive signal to the panel unit 120 at a predetermined timing synchronized with the panel unit drive trigger signal on the basis of the received video signal and the panel unit drive trigger signal. The panel unit drive signal is a signal such as a voltage or a current for giving an instruction to change the state of the panel unit 120 so that brightness of each of pixels of the image displayed by the panel unit 120 becomes a predetermined brightness.

Further, the panel driver 150 transmits the light source unit drive trigger signal to the light source driver 140 at a predetermined timing synchronized with the panel unit drive trigger signal. The light source driver 140 transmits a light source unit drive signal to the light source unit 110 in synchronization with the received light source unit drive trigger signal. The light source unit drive signal is a signal such as a current for driving the light source of the light source unit 110. The light source driver 140 generates a light source drive signal using the electric power supplied from the power source 16.

Figure 5B:
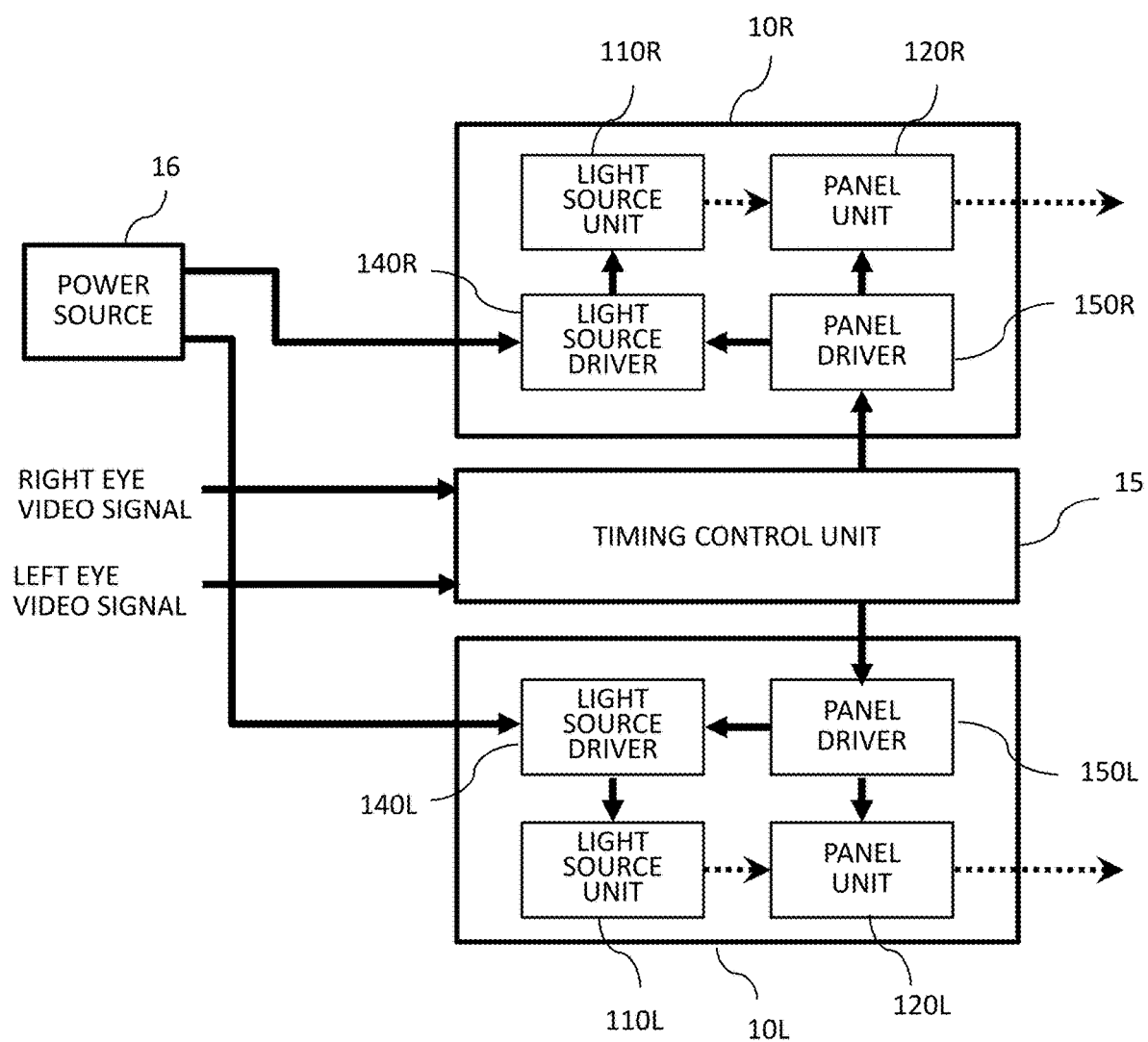
FIG. 5B is a diagram illustrating another example of a control block of a binocular HMD 1.

FIG. 5B is a diagram illustrating another example of the control block of the binocular HMD 1. A basic configuration of the block is similar to that of FIG. 5A, and differences will be described.

The binocular HMD 1 of the present example inputs the received or generated right eye and left eye video signals to the timing control unit 15. The timing control unit 15 temporarily stores the right eye and left eye video signals and transmits them to the right eye panel driver 150R and the left eye panel driver 150L. In a case in which the timing control unit 15 transmits the right eye and the left eye video signals, a transmission timing is adjusted so that both video signals are shifted by a predetermined time.

Based on the received video signals, the panel drivers 150R and 150L transmits the panel unit drive signal to the panel units 120R and 120L at a predetermined timing synchronized with the video signals. Further, the panel drivers 150R and 150L transmit the light source unit drive trigger signal to the light source drivers 140R and 140L at a predetermined timing synchronized with the video signals.

In the above example, the right eye image display unit 10R and the left eye image display unit 10L are configured to include the light source drivers 140R and 140L and the panel drivers 150R and 150L independently, respectively, but the present invention is not limited thereto, and either or both of the light source driver and the panel driver may be shared by the right eye image display unit 10R and the left eye image display unit 10L, and respective timings may be controlled.

Next, an image display operation by the image display unit 10 of the binocular HMD 1 will be described. The image display unit 10 includes the light source unit 110 and the panel unit 120 as described above. The light source unit 110 includes the light source 111R that emits red light, the light source 111G that emits green light, and the light source 111B that emits blue light. Further, the panel unit 120 includes the liquid crystal panel 122 that generates an image. The liquid crystal panel 122 does not include a filter or the like for converting colors, and generates an image having substantially the same color as the incident light.

Figure 6:
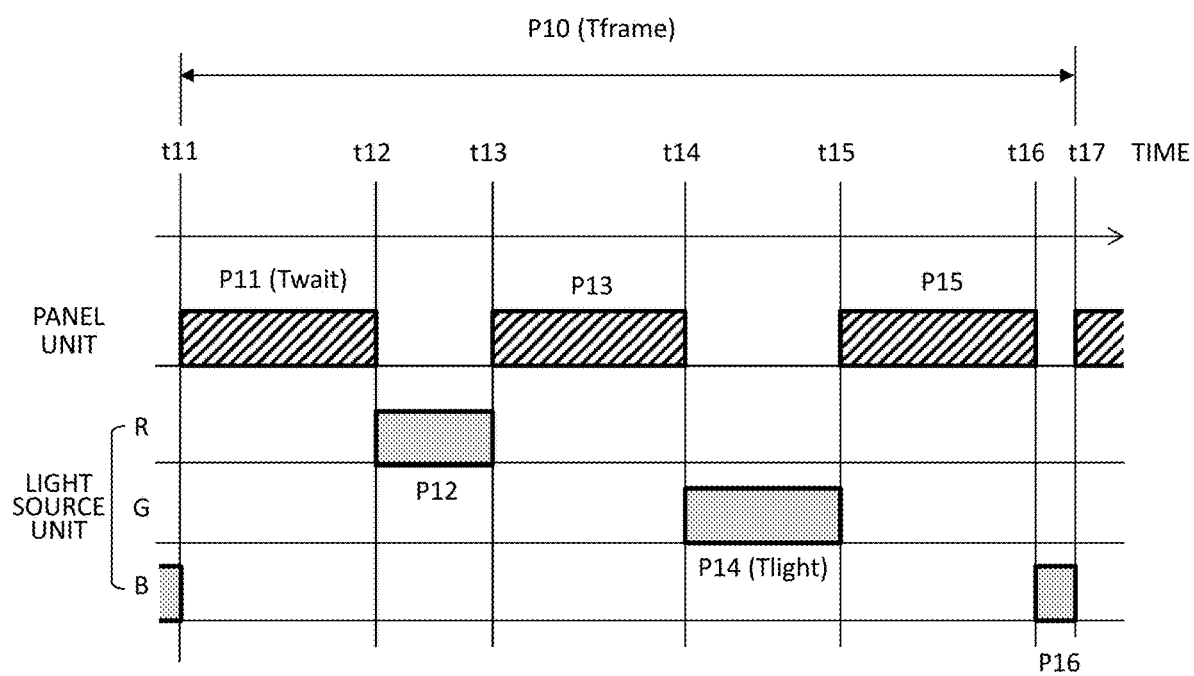
FIG. 6 is a diagram illustrating an image display operation of one image display unit 10.

FIG. 6 is a diagram illustrating an example of a time sequence in which one image display unit 10 displays an image. The image display unit 10 displays a color image in according to a field sequential scheme in which red (R), green (G), and blue (B) images are sequentially displayed. In other words, the image display unit 10 displays an image of one frame by displaying a red image, a green image, and a blue image in the described order in accordance with a gradation value of each color of each pixel of a color image.

In FIG. 6, a period P10 from a time t11 to a time t17 is a period in which an image of one frame is displayed. A frame length of one frame is indicated by Tframe.

The time t11 is a beginning of the period of one frame, and a period from the time t11 to a time t13 is a period in which the red image is displayed. First, in the period P11 from the time t11 to a time t12, the image display unit 10 performs preparation for displaying the red image. The panel driver 150 transmits image data indicating the gradation value of red of each pixel to the panel unit 120 as the panel unit drive signal. Then, the panel driver 150 stands by until the state of the panel unit 120 is stabilized in a state corresponding to the image data. In other words, in a case in which the liquid crystal panel 122 is used as the panel unit 120, it stands by until the orientation state of the angle pixels of the liquid crystal transitions to a state corresponding to the image data. The standing by until the state of the panel unit 120 is stabilized after the image data is transmitted to the panel unit 120 is necessary as the preparation for the image display unit 10 to display a predetermined image. Therefore, in this period, it is unable to turn on the light source and display the image. Hereinafter, the period during which the light source is not turned on until the state of the panel unit 120 is stabilized is referred to as a "standby period" of the panel unit 120. The length of the standby period does not depend on a color of an image to be displayed.

After the standby period P11 has ended, a period P12 from the time t12 to the time t13 is a period in which the light source 111R is turned on to display the red image. At the time t12, the panel driver 150 transmits the light source unit drive trigger signal for giving an instruction to turn on the light source 111R that emits the red light to the light source driver 140. In response to the light source unit drive trigger signal, the light source driver 140 transmits the light source unit drive signal for giving an instruction to start applying the current to the light source 111R to the light source unit 110. Accordingly, the light source 111R starts emitting the red light at the time t12. At the time t13, the panel driver 150 transmits the light source unit drive trigger signal for giving an instruction to stop applying the current to the light source 111R to the light source driver 140. In response to the light source unit drive trigger signal, the light source driver 140 transmits the light source unit drive signal for giving an instruction to stop applying the current to the light source 111R to the light source unit 110. Accordingly, the light source 111R stops emitting the red light at the time t13. In other words, in the period P12, the image display unit 10 displays the red image. Hereinafter, the period in which the light source is turned on to display the image is referred to as a "lighting period" of the light source unit 110.

Then, a period from the time t13 to the time t15 is a period in which the green image is displayed. Of these, preparation for displaying the green image is performed in the standby period P13 from the time t13 to a time t14. In the standby period P13, the panel unit 120 is shifted to a state corresponding to the image data indicating a gradation value of green of each pixel. A length of the standby period P13 is substantially equal to the length of the standby period P11 of the red image. The lighting period P14 from the time t14 to the time t15 is a period in which the light source 111G emitting the green light is turned on to display the green image. Lighting control for the light source 111G is similar to that of the light source 111R of the red light.

Then, a period from the time t15 to a time t17 is a period in which the blue image is displayed. Of these, preparation for displaying the blue image is performed in a standby period P15 from the time t15 to a time t16, In the standby period P15, the panel unit 120 is shifted to a state corresponding to the image data indicating a gradation value of blue of each pixel. A length of the standby period P15 is substantially equal to the length of the standby period P11 of the red image and the length of the standby period P13 of the green image. The lighting period P16 from the time t16 to the time t17 is a period in which the light source 111B emitting the blue light is turned on to display the blue image. Lighting control for the light source 111B is similar to that of the light source 111R of the red light.

The image display unit 10 can continue the image display of the still image, the moving picture, or the like by displaying the image of the period P10 of one frame in accordance with the operation from the time t11 to the time t17 and repeating the above operation while appropriately updating the image data to be displayed in units of frames.

In the image display unit 10, the lengths of the periods for displaying the images of the respective colors may be equal to or different from each other. In other words, the lengths of the lighting periods P12, P14, and P16 may be equal to or different from each other. Further, the current values flowing to the light sources 111R, 111G, and 111B emitting the respective color lights may be equal or different from each other. Further, the current waveform flowing to the light sources 111R, 111G, and 111B may be constant currents with no time variation or may be pulse width modulated currents.

For example, when, in the respective periods in which the red, green, and blue images are displayed, the currents flowing to the respective light sources of red, green and blue are equal to one another with no time variation, and the lengths of the periods in which the images of the respective colors are displayed are set to predetermined lengths, the image display unit 10 can display the images with a predetermined white balance. As another example, when, in the respective periods in which the red, green, and blue images are displayed, the lengths of the periods in which the images of the respective colors are displayed are equal to one another, and the current values flowing to the respective light sources of red, green, and blue are set to predetermined values or duty ratios of pulse width modulation are to predetermined values, the image display unit 10 can display the images with a predetermined white balance.

Further, the length of the standby period of the panel unit associated with each color image display is indicated by Twait, a color in which the length of the period for displaying the image is indicated by a color C, and the length of the lighting period of the light source corresponding to the image of the color C is indicated by Tlight. In the example illustrated in FIG. 6, the color C is green. In the present embodiment, Twait≥Tlight is assumed.

The binocular HMD 1 of the present embodiment includes the two image display units, that is, the right eye image display unit 10R and the left eye image display unit 10L. If the light sources respective installed in the two image display units are turned on at the same time to generate the image light, the peak of the current supplied from the power source 16 to the light source driver 140 becomes very large at that timing. If a power source that can supply a large peak current is used in order to deal with it, there is a problem in that the size of the power source is increased, and thus the size of the binocular HMD is increased. In this regard, in the present embodiment, the image display timings of the two image display units are adjusted to thereby suppress the peak of the current supplied from the power source.

Figure 7:
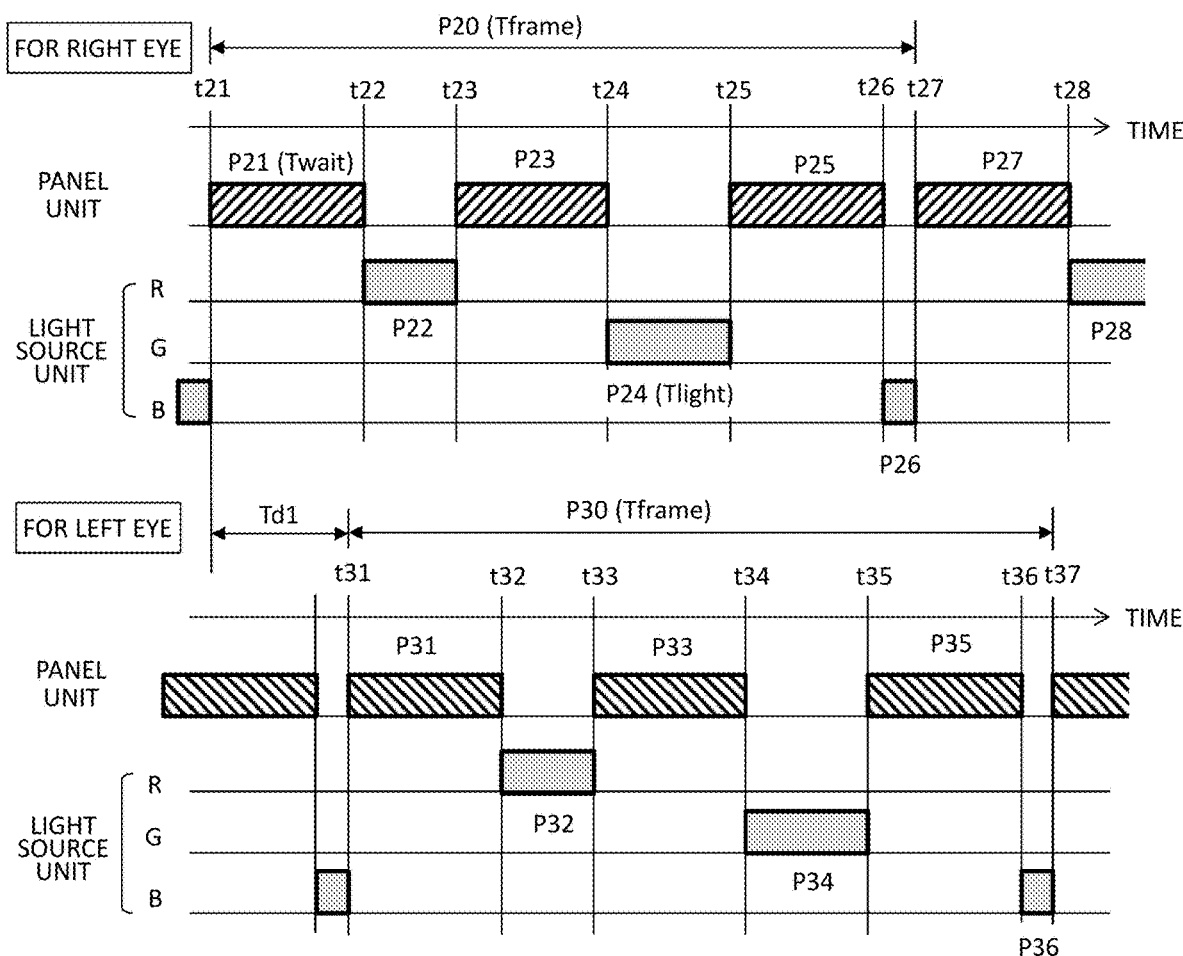
FIG. 7 is a diagram illustrating an image display operation of two image display units 10.

FIG. 7 is a diagram illustrating an example of a time sequence in which the two image display units 10 display the images. An upper part illustrates the display timing of the right eye image display unit 10R, and a lower part illustrates the display timing of the left eye image display unit 10L. A period P20 from a time t21 to a time t27 is a period of one frame in which the right eye image display unit 10R sequentially displays the red, green and blue images one by one. A period P30 from a time t31 to a time t37 is a period of one frame in which the left eye image display unit 10L sequentially displays the red, green, and blue images one by one. The lengths of standby periods P21, P23, and P25 of the panel units associated with the respective color displays in the right eye image display unit 10R and the lengths of standby periods P31, P33, and P35 of the panel units associated with the respective color displays in the left eye image display unit 10L are identical and indicated by Twait.

The lengths of lighting periods P22, P24, and P26 in which the images of the respective colors are displayed in the right eye image display unit 10R and the lengths of lighting periods P32, P34, and P36 in which the images of the respective colors are displayed in the left eye image display unit 10L are displayed are equal to each other for each color.

As illustrated in FIG. 7, the timing control unit 15 controls the right eye image display unit 10R and the left eye image display unit 10L so that the period P20 in which the right eye image display unit 10R displays the image of one frame and the period P30 in which the left eye image display unit 10L displays the image of one frame overlap in time and are shifted from each other by a predetermined delay time Td1=t31−t21. Here, with 0≤Td1<Tframe is assumed, and the delay time Td1 is within the period of one frame.

The length of the standby period associated to each color image display is indicated by Twait, a color in which the length of the period for displaying the image is maximum is indicated by the color C (green), and the length of the lighting period for displaying the image of the color C is indicated by Tlight. A sum of the overlap lighting period in which both of the light sources of the right eye image display unit 10R and the light source of the left eye image display unit 10L are turned on at the same time is indicated by Tsum. In the case of the present example, the timing control unit 15 sets the delay time Td1 so that both light sources are not turned on at the same time in the period in which the image of one frame is displayed, that is, the sum Tsum of the overlap lighting periods is 0. A condition in which this is satisfied is $$T\text{light} \leq Td1 \leq T\text{wait} \quad (1a), \text{ or}$$

$$T\text{frame} - T\text{wait} \leq Td1 \leq T\text{frame} - T\text{light} \quad (1b)$$

FIG. 7 illustrates an example in which the delay time Td1 is selected to satisfy Formula (1a). A light emission start time t32 of the red light source of the left eye image display unit 10L is later than a light emission end time t23 of the red light source of the right eye image display unit 10R (t23<t32), and a light emission end time t33 of the red light source of the left eye image display unit 10L is earlier than a light emission start time t24 of the green light source of the right eye image display unit 10R (t33<t24). In other words, the lighting period P32 of the red light source of the left eye image display unit 10L does not overlap the lighting period P22 of the red light source of the right eye image display unit 10R and does not overlap the lighting period P24 of the green light source of the right eye image display unit 10R. Similarly, the lighting period P34 of the green light source of the left eye image display unit 10L does not overlap the lighting period P24 of the green light source of the right eye image display unit 10R and does not overlap the lighting period P26 of the blue light source of the right eye image display unit 10R. The lighting period P36 of the blue light source of the left eye image display unit 10L does not overlap the lighting period P26 of the blue light source of the right eye image display unit 10R and does not overlap the lighting period P28 of the red light source of the right eye image display unit 10R.

Accordingly, control can be performed such that in the period in which any one of the light sources of the right eye image display unit 10R is turned on, any of the light sources of the left eye image display unit 10L is not turned on, and in the period in which any one of the light sources of the left eye image display unit 10L is turned on, any of the light sources of the right eye image display unit 10R is not turned.

The same can apply in a case in which the delay time Td1 is selected to satisfy Formula (1b). In this case, the lighting period P32 of the red light source of the left eye image display unit 10L is after the lighting period P26 of the blue light source of the right eye image display unit 10R but does not overlap the lighting period P26 and does not overlap the lighting period P28 of the lit red light source.

In other words, it is possible to prevent two or more light sources from being turned on at the same time at any time by the timing control unit 15 selecting the delay time Td1 so that Formula (1a) or Formula (1b) is satisfied and controlling the right eye image display unit 10R and the left eye image display unit 10L. As a result, it is possible to prevent the peak current from increasing because the two light sources are driven at the same time. Since the image is displayed by both the right eye image display unit 10R and the left eye image display unit 10L during one frame, the brightness of the display image does not decrease.

In the above example, the right eye image display unit 10R and the left eye image display unit 10L have displayed the red, green, and blue images in the described order during the period of one frame, but the order of the colors to be displayed is not limited thereto but optional.

Further, the light source unit 110 includes the three light sources 111R, 111G, and 111B that emit the red light, the green light, and the blue light, respectively, and displays a full color image, but the light source that emits light of a color other than the above-described colors may be added. Accordingly, it is possible to increase a color reproduction range which the image display unit can display. Conversely, it is possible to limit the color reproduction range that can be displayed and employ only a light source that emits light of two types of colors, or a light source that emits light of one type of color. Accordingly, it is possible to reduce the size of the optical system.

As described above, in a case in which the number of light sources is changed, the number of sets of the standby period of the panel unit and the lighting period of the light source in the period in which the image of one frame is displayed becomes by the changed number of light sources, and the image display is displayed in accordance with the field sequential scheme. In this case, control may be performed such that the period in which the right eye image display unit 10R displays the image of one frame and the period in which the left eye image display unit 10L displays the image of one frame are shifted from each other by a predetermined delay time Td1.

In the above example, the panel unit 120 includes the liquid crystal panel 122 but does not include a filter or the like for converting colors and generate the images of the respective colors sequentially in accordance with the field sequential scheme, but the present invention is not limited thereto and can be applied even when the panel unit 120 includes a color conversion filter. In this case, the light source unit 110 may include the three light sources 111R, 111G, and 111B that emit the red light, the green light, and the blue light, respectively, and turn on light sources of all colors the same time or may include a light source that emits white light. In this case, control may be performed such that the period in which the right eye image display unit 10R displays the image of one frame and the period in which the left eye image display unit 10L displays the image of one frame are shifted from each other by a predetermined delay time Td1. According to this method, a color break phenomenon in the field sequential scheme can be suppressed.

According to the first embodiment, it is possible to provide the binocular HMD (image display device) in which since the two or more light sources are prevented from being turned on at the same time at any time, it is possible to prevent the peak current from increasing since the two light sources are simultaneously driven. Further, since the image is displayed by both the right eye image display unit 10R and the left eye image display unit 10L during one frame, it is possible to display an image with the high luminance.

Second Embodiment

In a second embodiment, the maximum value Tlight of the length of the lighting period of one light source may be equal to or larger than the length Twait of the standby period of the panel unit associated with each color image display (Tlight≥Twait). Accordingly, it is possible to increase the lighting time of the light source in the period of one frame and to improve the luminance of the binocular HMD 1. However, when Tlight≥Twait, there is a period in which the light source of the right eye image display unit 10R and the light source of the left eye image display unit 10L are turned on at the same time within the period in which the image of one frame is displayed (that is, the sum Tsum of the overlap lighting period>0). Therefore, in the present embodiment, the delay time is set so that the sum Tsum of the overlap lighting period is minimized, and a configuration of the power source 16 is changed to stand even when the peak of the current source supplied to the light source driver 140 is large. First, a configuration of the power source will be described.

Figure 8A:
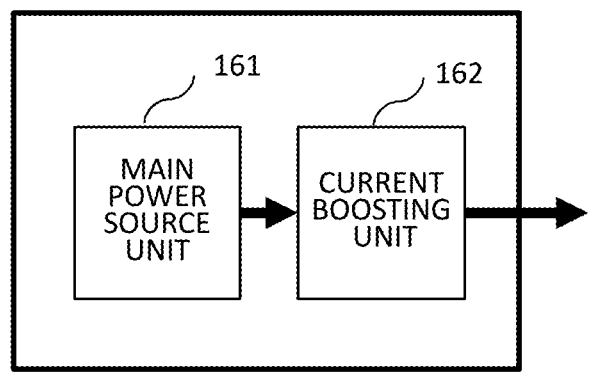
FIGS. 8A and 8B are diagrams illustrating a configuration and an operation of a power source (a second embodiment)
Figure 8B:
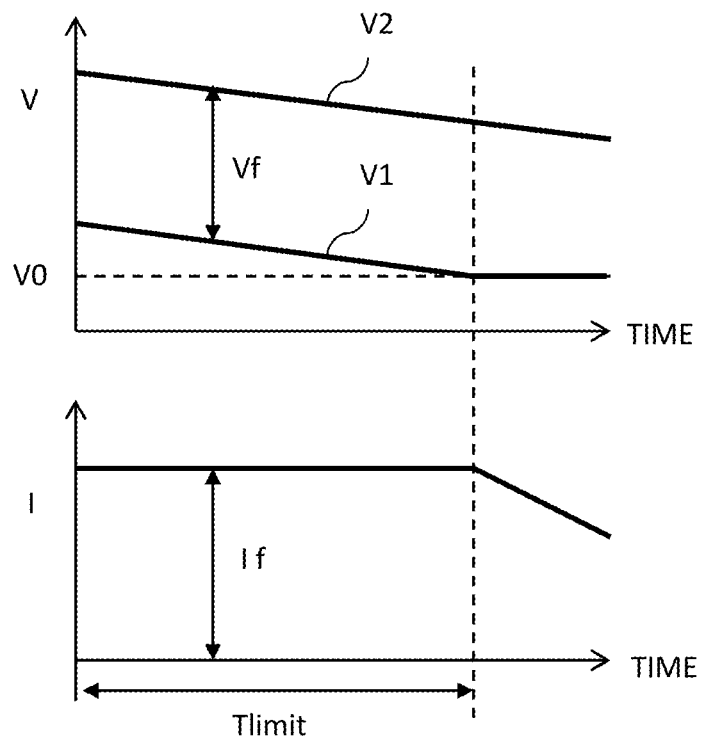

FIGS. 8A and 8B are diagrams illustrating a configuration and an operation of the power source 16A according to the present embodiment. FIG. 8A illustrates a configuration example of a power source 16 A, and the power source 16 A includes a main power source unit 161 and a current boosting unit 162. The main power source unit 161 includes, for example, a rechargeable battery, and the current boosting unit 162 includes, for example, a capacitor having a predetermined capacity. The main power source unit 161 can supply up to a predetermined maximum current. On the other hand, the current boosting unit 162 plays a role of supplying an insufficient current at a timing at which it is necessary to supply a large current exceeding the maximum current to the light source driver 140. However, since the current boosting unit 162 can discharge electric charges only up to a predetermined charge amount, there is an upper limit to a time during which the current can be supplied beyond the maximum current of the main power source unit 161.

FIG. 8B is a diagram for describing an operation characteristic of the power source 16A. FIG. 8B is a graph illustrating a time variation in a potential V applied to the light source of the light source unit 110 via the power source 16A through the light source driver 140 and a time variation in the current I flowing to the light source. The light source driver 140 controls at least one of a potential V2 of a plus terminal of the light source and a potential V1 of a minus terminal such that the current I is constant to be a predetermined current If and drives the light source. A voltage Vf applied to the light source is a difference between the potential V2 and the potential V (Vf=V2−V1). As the drive time of the light source elapses, the potentials V1 and V2 of the power source 16A decrease, but the light source driver 140 tries to keep the voltage Vf at a predetermined value in order to maintain the current If to be a predetermined value. However, if the potential V1 reaches a predetermined lower limit potential V0, the potential difference (V2−V1) is unable to be maintained to be the predetermined value Vf, and the current I is unable to be maintained to be the predetermined value If. As described above, even in the power source 16A including the current boosting unit 162, there is a time Tlimit until the voltage of the power source 16A drops as the light source unit 110 is driven, and the predetermined current If is unable to be supplied to the light source unit 110, and the time Tlimit is referred to as a "time limit."

Even in the image display of the present embodiment, control is performed such that the period in which the right eye image display unit 10R displays an image of one frame and the period in which the left eye image display unit 10L displays the image of one frame overlap each other and are shifted from each other by a predetermined delay time Td2. In other words, 0≤Td2<Tframe is satisfied for the length Tframe of the period of one frame. Further, the delay time Td2 is selected so that the sum Tsum of the overlap lighting period in which the light source of the right eye image display unit 10R and the light source of the left eye image display unit 10L are turned on at the same time in the period in which the image of one frame is displayed is equal to or less than the time limit Tlimit of the power source 16A.

Preferably, the timing control unit 15 selects the delay time Td2 so that the sum T sum of the overlap lighting period is minimum. Accordingly, the capacity of the current boosting unit 162 in the power source 16A can be minimized, and the size of the binocular HMD 1 can be reduced.

Next, a specific example of the image display in the present embodiment is illustrated. In the following description, the length of the standby period associated with each color image display is indicated by Twait, the length of the lighting period in which the red image is displayed is indicated by Tred, the length of the lighting period in which the green image is displayed is indicated by Tgreen, and the length of the lighting period in which the blue image is displayed is indicated by Tblue.

Figure 9A:
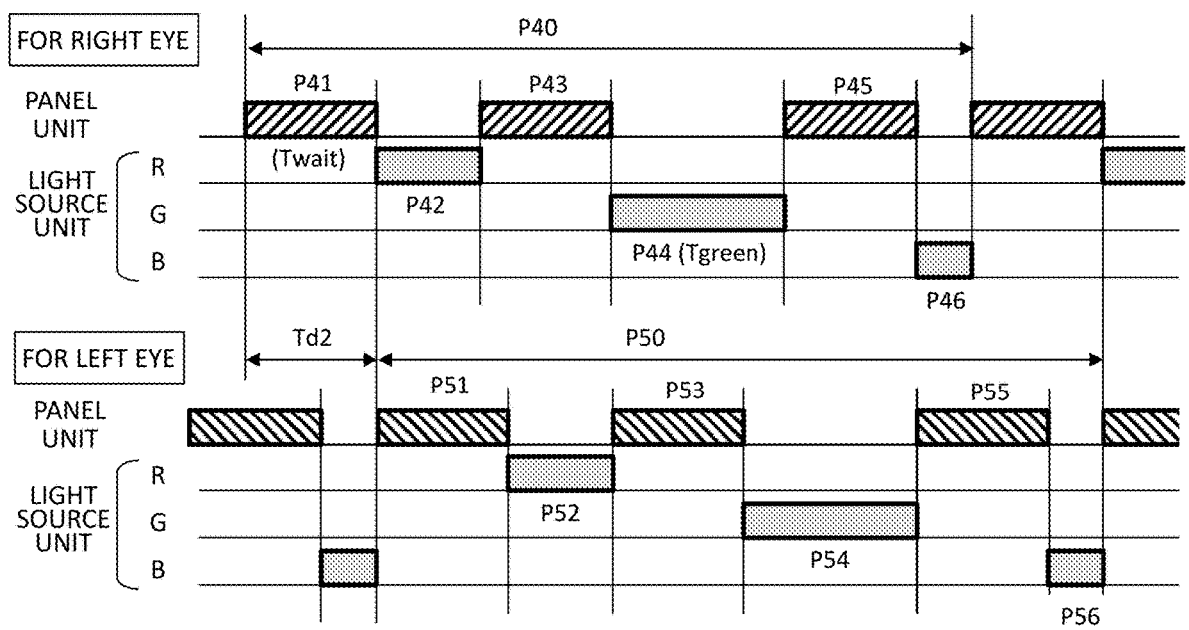
FIGS. 9A and 9B are diagrams illustrating a first case of an image display operation in the second embodiment.
Figure 9B:
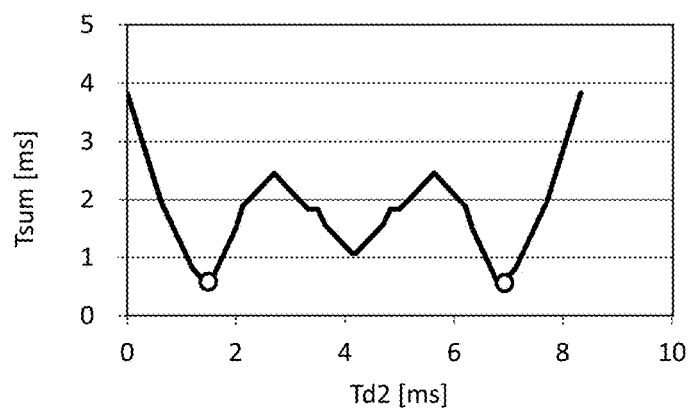

FIGS. 9A and 9B are diagrams illustrating a first case of an image display operation in the present embodiment. FIG. 9A illustrates a time sequence, and FIG. 9B illustrates the sum Tsum of the overlap lighting period. In the first case, only the length of the lighting period in which the green image among red, green, and blue is displayed is equal to or larger than the standby time of the panel unit, and the length of the lighting period in which the red and blue images are displayed is less than the length of the standby time of the panel unit. In other words, Tred<Twait, Tgreen≥Twait, and Tblue<Twait.

In the time sequence of FIG. 9A, a period P40 is a period of one frame of the right eye image display unit 10R, and a period P50 is a period of one frame of the left eye image display unit 10L. Then, the period P50 of one frame of the left eye image display unit 10L is shifted from the period P40 of one frame of the right eye image display unit 10R by the delay time Td2.

The timing control unit 15 selects the delay time Td2 so that the sum Tsum of the overlap lighting period is minimum. The condition preferably satisfies one of the following two Formulas:

$$Td2 = T\text{wait} \quad (2a); \text{ and}$$

$$Td2 = T\text{frame} - T\text{wait} \quad (2b).$$

FIG. 9A illustrates a case in which the condition of Formula (2a) is selected as the delay time Td2. A lighting period P44 of the green light of the right eye image display unit 10R partially overlaps a lighting time P54 of the green light of the left eye image display unit 10L subsequent thereto, and the other lighting periods P42, P52, P46, and P56 do not overlap.

Further, in a case in which the condition of Formula (2b) is selected as the delay time Td2, each color image display of the left eye image display unit 10L precedes each color image display of the right eye image display unit 10R. Then, the lighting time P54 of the green light of the left eye image display unit 10L and the lighting period P44 of the green light of the right eye image display unit 10R subsequent thereto partially overlap, and the lighting periods P52, P42, P56, and P46 do not overlap.

FIG. 9B is a graph illustrating a relation between the delay time Td2 and the sum Tsum of the overlap lighting period. Here, as specific numerical values, the length Twait of the standby period of the panel unit is assumed to be 1.50 ms, the length Tred of the lighting period of the red light is assumed to be 1.20 ms, the length Tgreen of the lighting period of the green light is assumed to be 2.00 ms, length Tblue of the lighting period of the blue light is assumed to be 0.63 ms.

In the case of the delay time Td2=1.50 ms satisfying the condition of Formula (2a), the sum Tsum of the overlap lighting period is 0.50 ms (minimum value). Similarly, in the case of the delay time Td2=6.83 ms satisfying the condition of Formula (2b), the sum Tsum of the overlap lighting period is 0.50 ms (minimum value). In the case of another delay time Td2, the sum T sum of the overlap lighting period>0.50 ms. As described above, the delay time Td2 is selected to satisfy Formula (2a) or Formula (2b), the sum Tsum of the overlap lighting period can be minimized. Of course, even if any other delay time Td2 is selected, it is obvious that it can be drastically reduced as compared with the sum Tsum of the overlap lighting period is 3.83 ms when the delay time Td2=0.

Figure 10A:
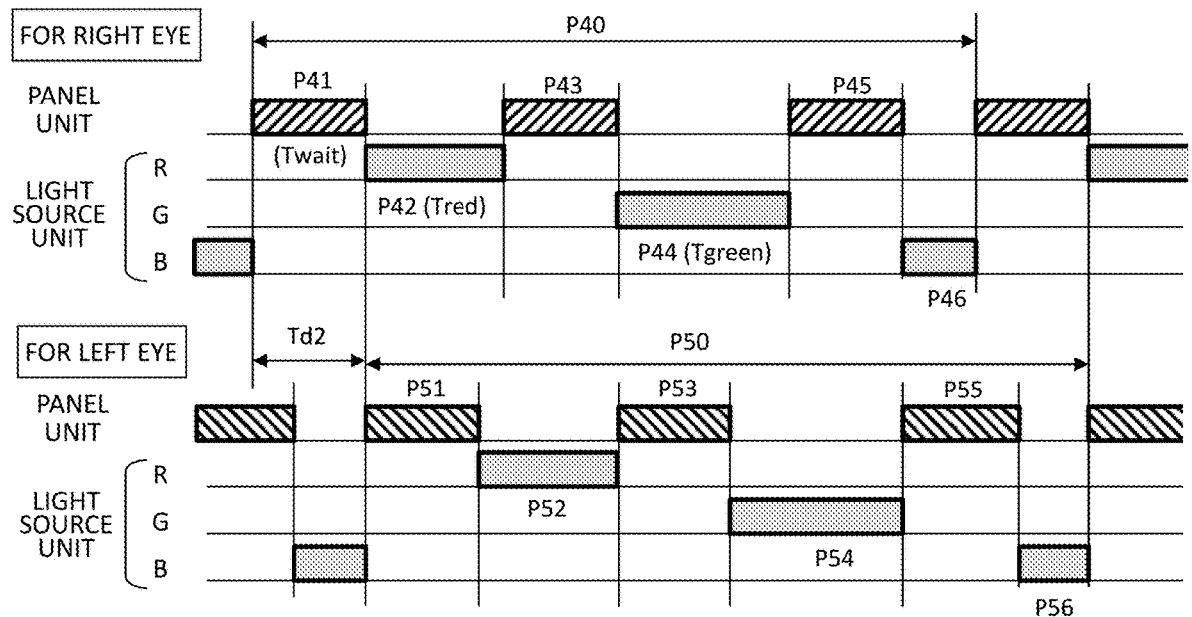
FIGS. 10A and 10B are diagrams illustrating a second case of the image display operation in the second embodiment.
Figure 10B:
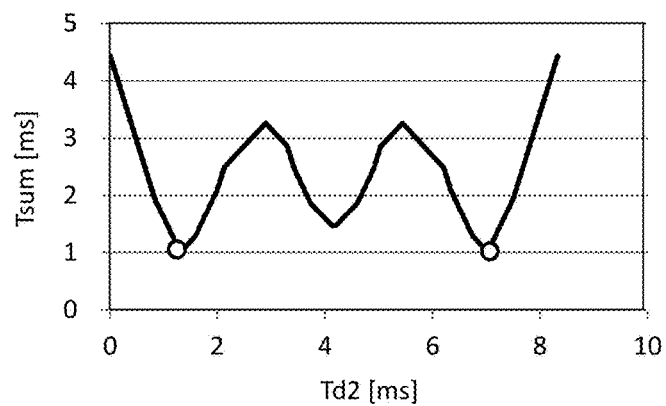

FIGS. 10A and 10B are diagrams illustrating a second case of the image display operation in the present embodiment, FIG. 10A illustrates a time sequence, and FIG. 10B illustrates the sum Tsum of the overlap lighting period. In the second case, the length of the lighting period in which the red image and the green image among red, green and blue are displayed is equal to or larger than the standby time of the panel unit, and the length of the lighting period in which the blue image is displayed is less than the length of the standby time of the panel unit. In other words, Tred≥Twait, Tgreen≥Twait, and Tblue<Twait.

The timing control unit 15 selects the delay time Td2 so that the sum Tsum of the overlap lighting period is minimum. In the second case, it is preferable that Formula (2a) or Formula (2b) is satisfied.

FIG. 10A illustrates a case in which the condition of Formula (2a) is selected as the delay time Td2. A lighting period P42 of the red light of the right eye image display unit 10R and a lighting time P52 of the red light of the left eye image display unit 10L subsequent thereto partially overlap, and a lighting period P44 of the green light of the right eye image display unit 10R and a lighting time P55 of the green light of the left eye image display unit 10L subsequent thereto partly overlap, and the sum Tsum of the overlap lighting periods of both becomes minimum. The lighting periods P46 and P56 of the blue light do not overlap.

FIG. 10B is a graph illustrating a relation between the delay time Td2 and the sum Tsum of the overlap lighting period. Here, as specific numerical values, the length Twait of the standby period of the panel unit is assumed to be 1.30 ms, the length Tred of the lighting period of the red light is assumed to be 1.60 ms, the length Tgreen of the lighting period of the green light is assumed to be 2.00 ms, length Tblue of the lighting period of the blue light is assumed to be 0.83 ms.

In the case of the delay time Td2=1.30 ms satisfying the condition of Formula (2a), the sum Tsum of the overlap lighting period is 1.00 ms (minimum value). Similarly, in the case of the delay time Td2=7.03 ms satisfying the condition of Formula (2b), the sum Tsum of the overlap lighting period is 1.00 ms (minimum value). As described above, the delay time Td2 is selected to satisfy Formula (2a) or Formula (2b), the sum Tsum of the overlap lighting period can be minimized.

Figure 11A:
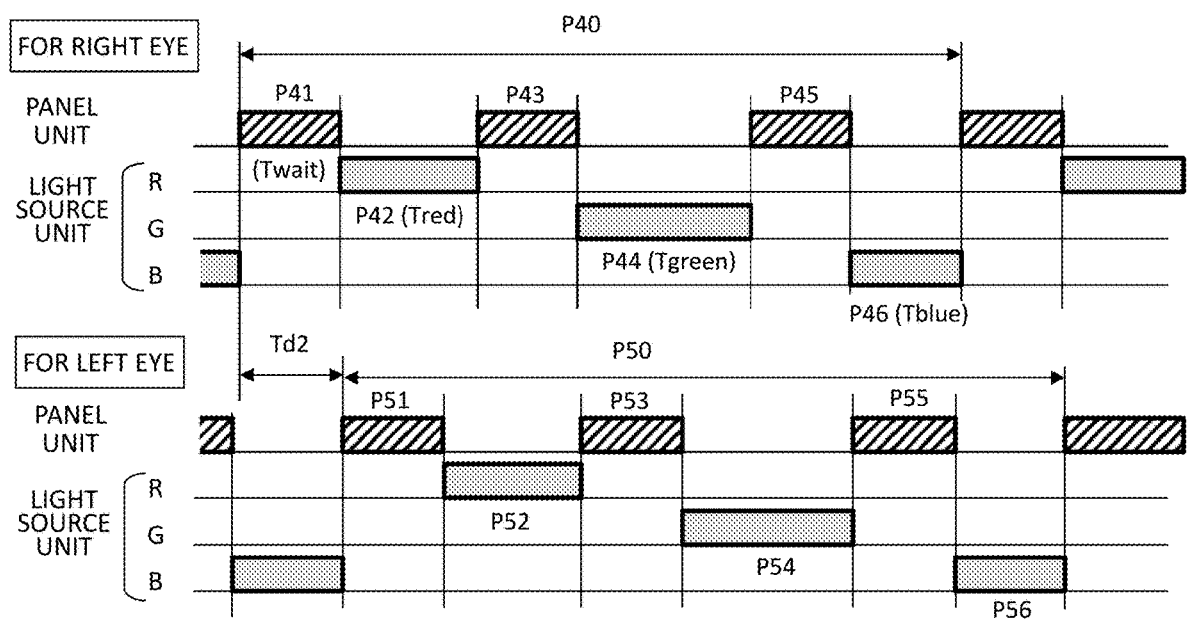
FIGS. 11A and 11B are diagrams illustrating a third case of the image display operation in the second embodiment.
Figure 11B:
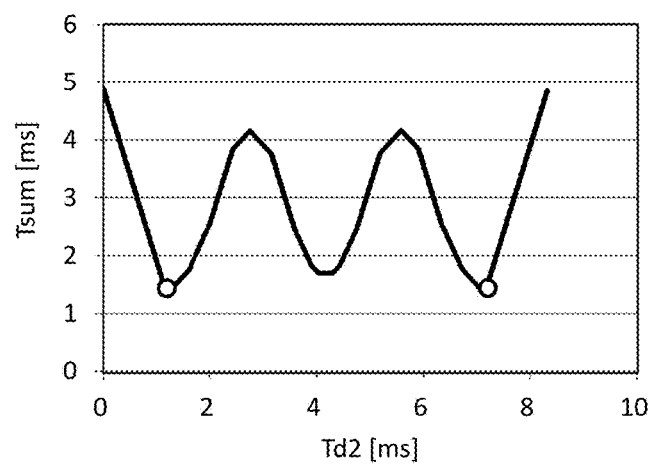

FIGS. 11A and 11B are diagrams illustrating a third case of the image display operation in the present embodiment, FIG. 11A illustrates a time sequence, and FIG. 11B illustrates the sum Tsum of the overlap lighting period. In the third case, the length of the lighting period in which all the red, green, and blue images are displayed is equal to or larger than the standby time of the panel unit. In other words, Tred≥Twait, Tgreen≥Twait, and Tblue≥Twait. Of these, the length of the period with the shortest lighting period is indicated by Tlight0. In this example, the minimum value Tlight0 of the lighting time is the lighting period Tblue of the blue light.

The timing control unit 15 selects the delay time Td2 so that the sum Tsum of the overlap lighting period is minimum. The condition preferably satisfies one of the following two Formulas:

$$T\text{wait} \le Td2 \le T\text{light0} \quad (3a); \text{ and}$$

$$T\text{frame} - T\text{light0} \le Td2 \le T\text{frame} - T\text{wait} \quad (3b).$$

FIG. 11A illustrates a case where the condition of Formula (3a) is selected as the delay time Td2. A lighting period P42 of the red light of the right eye image display unit 10R and a lighting time P52 of the red light of the left eye image display unit 10L subsequent thereto partially overlap, a lighting period P44 of the green light of the right eye image display unit 10R and a lighting time P54 of the green light of the left eye image display unit 10L subsequent thereto partially overlap, a lighting period P46 of the blue light of the right eye image display unit 10R and a lighting time P56 of the blue light of the left eye image display unit 10L partially overlap, and the sum Tsum of the overlapping periods becomes minimum.

FIG. 11B is a graph illustrating a relation between the delay time Td2 and the sum T sum of the overlap lighting period. Here, as the specific numerical value, Twait is assumed to be 1.15 ms, Tred is assumed to be 1.60 ms, Tgreen is assumed to be 2.00 ms, and Tblue is assumed to be 1.28 ms. In this case, Tlight0 is 1.28 ms.

In 1.3 ms≤Td2≤1.28 ms satisfying the condition of Formula (3a) or 7.05 ms≤Td2≤7.18 ms satisfying the condition of Formula (3b), the sum Tsum of the overlap lighting period is =1.43 ms (minimum value). As described above, the delay time Td2 is selected to satisfy Formula (3a) or Formula (3b), and thus the sum T sum of the overlap lighting period can be minimized.

Here, a modified example of the first case illustrated in FIGS. 9A and 9B will be described. In other words, it is a case in which only the length Tgreen of the lighting period in which an image of one color (green) among red, green, and blue is displayed is equal to or larger than the standby time Twait of the panel unit. In FIGS. 9A and 9B, the delay time Td2 is set from the condition of Formula (2a) or Formula (2b), the lighting period P44 of the green light of the right eye image display unit 10R and the lighting time P54 of the green light of the left eye image display unit 10L overlap.

On the other hand, in the modified example, the delay time Td2 is set so that the lighting period P44 of the green light of the right eye image display unit 10R does not overlap with the lighting time P54 of the green light of the left eye image display unit 10L and overlaps the lighting periods P52 and P56 of other color light (the red light and the blue light) of the left eye image display unit 10L instead.

As specific numerical values, Twait is assumed to be 1.00 ms, Tred is assumed to be 0.80 ms, Tgreen is assumed to be 4.00 ms, and Tblue is assumed to be 0.53 ms. If the delay time Td2 at this time is set to 4.00 ms≤Td2≤4.33 ms, the sum T sum of the overlap lighting period is 2.66 ms (minimum value).

In the above example, the timing control unit 15 sets the delay time Td2 so that the sum Tsum of the overlap lighting period is minimum, but the present invention is not limited thereto. For example, when there are a plurality of overlap lighting periods in the period of one frame, it is also effective to select the delay time Td2 so that the overlap lighting period which is the maximum length is minimum.

Further, the power source 16A illustrated in FIGS. 8A and 8B includes the current boosting unit 162, but the present invention is not limited thereto. In a case in which the time limit Tlimit is sufficiently longer than the period Tframe in which the image of one frame is displayed, the power source 16A may not include the current boosting unit 162.

As the power source 16, the power source 16B (not illustrated) including a voltage converting unit such as a DCDC converter capable of changing the voltage of the power source 16 may be used. In this case, the timing control unit 15 transmits a voltage conversion control signal to the power source 16B. The timing control unit 15 transmits the voltage conversion control signal for changing the voltage of the power source 16B to the power source so that the potential V1 does not reach the predetermined lower limit potential V0, and the power source 16B changes the voltage in accordance with the voltage conversion control signal. Accordingly, the light source driver 140 can drive the light source unit 110 so that the potential V1 does not reach the predetermined lower limit potential V0. The voltage converting unit is not installed in the power source 16B but may be installed in the light source driver 140.

According to the second embodiment, even when the length of the lighting period in which the image of at least one color is displayed is equal to or larger than the length of the standby period of the panel unit associated with each color image display, there is an effect in that the overlap lighting period of the light source of the right eye image display unit 10R and the light source of the left eye image display unit 10L is reduced, and the continuation of the peak current for the light source driving is suppressed. Further, it is possible to provide a binocular HMD (image display device) with a power source corresponding thereto.

Third Embodiment

In a third embodiment, before and after the right eye image display unit 10R displays an image of a first color in the field sequential driving, the left eye image display unit 10L displays images of second and third colors different from the first color. In other words, the right eye image display unit 10R and the left eye image display unit 10L are configured not to consecutively display images of the same color. Accordingly, it is possible to reduce the color break.

Figure 12A:
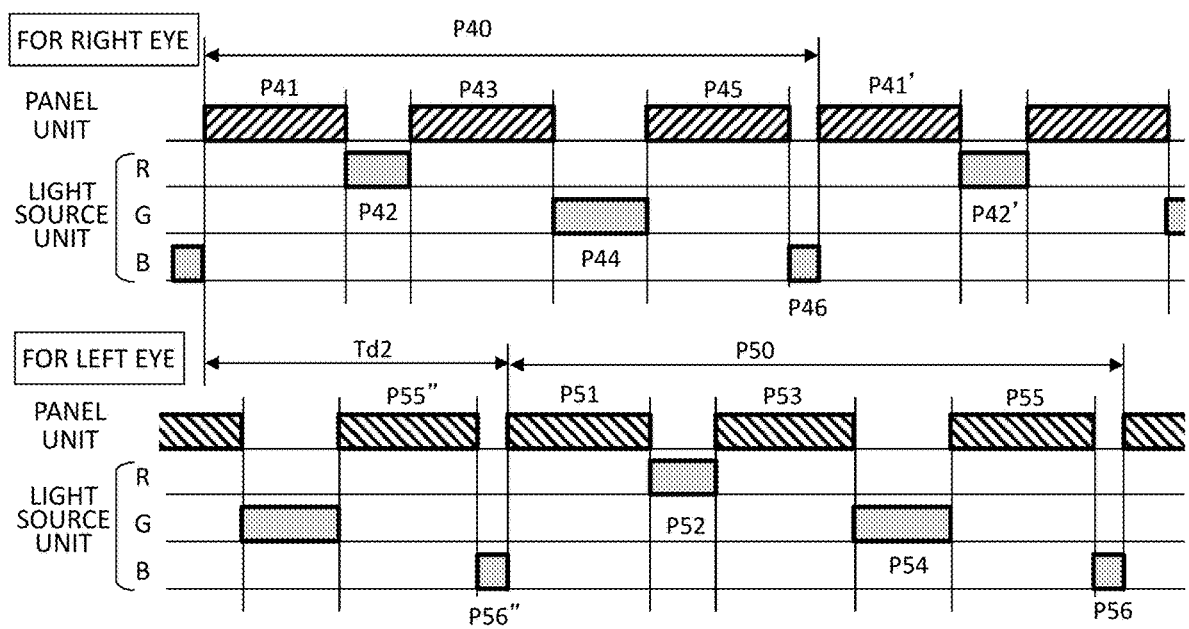
FIGS. 12A and 12B are diagrams illustrating an image display operation in a third embodiment.
Figure 12B:
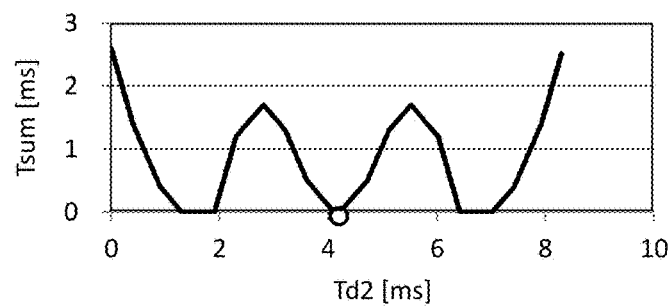

FIGS. 12A and 12B are diagrams illustrating an image display operation in the present embodiment, FIG. 12A illustrates a time sequence, and FIG. 12B illustrates the sum Tsum of the overlap lighting period. Here, the length Twait of the standby period of the panel unit associated with each color image display is equal to or larger than the maximum length Tlight of the lighting period of the light source (Twait≥Tlight).

In FIG. 12A, the order of colors displayed by the field sequential driving is common to the right eye image display unit 10R and the left eye image display unit 10L and is an order of red→green→blue. The timing control unit 15 decides the delay time Td2 so that the period P40 in which the right eye image display unit 10R displays an image of one frame and the period P50 in which the left eye image display unit 10L displays an image of one frame overlap, and the lighting order of the respective color lights is as follows:

P42 (red for the right eye)→P56" (blue for the left eye)→P44 (green for the right eye)→P52 (red for the left eye)→P46 (blue for the right eye)→P54 (green for the left eye)→P42' (red for right eye) . . . . Here, P56" is the previous frame, and P42' is a next frame.

In this case, it is possible to prevent the light source of the right eye image display unit 10R and the light source of the left eye image display unit 10L from being turned on at the same time.

FIG. 12B is a graph illustrating a relation between the delay time Td2 and the sum Tsum of the overlap lighting period. As specific numerical values, Twait is assumed to be 1.91 ms, Tred is assumed to be 0.90 ms, Tgreen is assumed to be 1.30 ms, and Tblue is assumed to be 0.40 ms. Here, 4.11 ms≤Td2≤4.22 ms is set as the delay time Td2, and thus the sum Tsum of the overlap lighting period becomes 0 ms (minimum value), and the two or more light sources are not turned on at the same time at any time. Tsum is 0 ms when the delay time Td2 is near 2 ms and near 7 ms, but since the right eye image display unit 10R and the left eye image display unit 10L consecutively display the same color image, it is not applicable in the present embodiment.

Here, when the display period of the image of the same color in the field sequential driving is long, a phenomenon that the image colors being displayed when the user 3 moves the eyes are separated into red, green, and blue and visually recognized (color break) occurs. In the present embodiment, before and after the right eye image display unit 10R displays the image of the first color, the left eye image display unit 10L displays images of the second and third colors other than the first color. In other words, in the binocular HMD 1, the right eye image display unit 10R and the left eye image display unit 10L do not consecutively display the images of the same color. Since the user 3 visually recognizes the image displayed by the binocular HMD 1 with both the right eye 30R and the left eye 30L, it is possible to reduce the color break visually recognized by the user 3.

In the above example, the length Twait of the standby period of the panel unit is equal to or larger than the maximum value Tlight of the length of the lighting time, but the present invention is not limited thereto. As described above in the second embodiment, even in a case in which the length of at least one lighting period is larger than the length of the standby period of the panel unit, when the sum Tsum of the overlap lighting period is minimized, and the right eye image display unit 10R and the left eye image display unit 10L are set not to consecutively display images of the same color, it is possible to reduce the color break visually recognized by the user 3.

In the above example, the order of colors to be displayed is common to the right eye image display unit 10R and the left eye image display unit 10L, but the present invention is not limited thereto. The order of colors to be displayed may be different between the right eye image display unit 10R and the left eye image display unit 10L. Here, in this case, since the timing at which the right eye image display unit 10R and the left eye image display unit 10L sequentially display the images of the same color is included, there is an effect in that the color break is reduced.

According to the third embodiment, before and after the right eye image display unit 10R displays the image of the first color in the field sequential driving, the left eye image display unit 10L displays the images of the second and third colors, and thus it is possible to reduce the color break visually recognized by the user.

Fourth Embodiment

In a fourth embodiment, in the field sequential driving, the length Twait of the standby period of the panel unit associated with each color image display may differ depending on each color. Accordingly, the degree of freedom of driving of the right eye image display unit 10R and the left eye image display unit 10L by the timing control unit 15 increases.

In the present embodiment, as the standby period Twait of the panel unit, in addition to a period (panel drive period) in which image data is transmitted to the panel unit, and it stands by until the state of the panel is stabilized, for example, a white balance adjustment period (panel adjustment period) or the like is added. The length of the panel adjustment period to be added may differ depending on each color so that the length of the total standby period associated with each color image display differs depending on each color. The lighting of the light source unit 110 is stopped in the panel adjustment period together with the panel drive period.

Figure 13A:
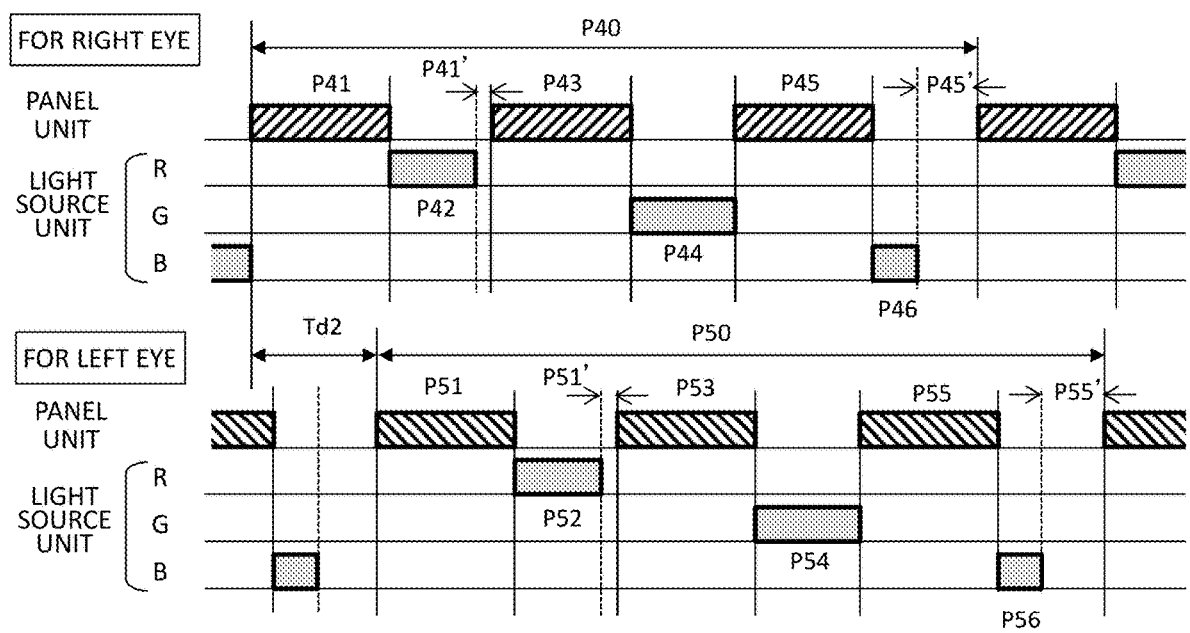
FIGS. 13A and 13B are diagrams illustrating an image display operation in a fourth embodiment.
Figure 13B:
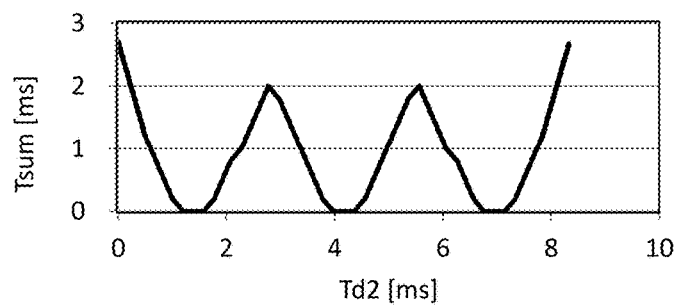

FIGS. 13A and 13B are diagrams illustrating the image display operation in the present embodiment, FIG. 13A illustrates a time sequence, and FIG. 13B illustrates the sum Tsum of the overlap lighting period. In this case, the length Twait of the standby period of the panel unit is set to be equal to or larger than the maximum length Tlight of the lighting period in image display of all colors (Twait≥Tlight).

In the time sequence of FIG. 13A, in a period P40 of one frame of the right eye image display unit 10R, periods P41, P43, and P45 are panel drive periods until the state of the panel is stabilized, and periods P41' and P45' are added as the panel adjustment period for white balance adjustment. The period P41' is associated with the standby period P41 of the red display, and a period P45' is associated with the standby period P45 of the blue display. This relation is similar even in the period P50 of one frame of the left eye image display unit 10L, and panel adjustment periods P51' and P55' are added. Further, period P42, P44, and P46 are periods in which the red, green, and blue light sources of the right eye image display unit 10R are turned on, respectively, and the light sources are not turned on in the panel adjustment periods P41' and P45'. The same applies to the left eye image display unit 10L.

In this case, the timing control unit 15 sets the delay time Td2 between the period P40 of one frame of the right eye image display unit 10R and the period P50 of one frame of the left eye image display unit 10L, and thus it is possible to prevent the light source of the right eye image display unit 10R and the light source of the left eye image display unit 10L from being turned on at the same time.

FIG. 13B is a graph illustrating a relation between the delay time Td2 and the sum Tsum of the overlap lighting period. As specific numerical values, the panel drive period common to the respective colors is assumed to be Tw=1.58 ms, the panel adjustment period of red is assumed to be Twr=0.20 ms, the panel adjustment period of green is assumed to be Twg=0 ms, and the panel adjustment period of blue is assumed to be Twb=0.70 ms. Further, the lighting period of red is assumed to be Tred=1.00 ms, the lighting period of green is assumed to be Tgreen=1.20 ms, and the lighting period of blue is assumed to be Tblue=0.50 ms. Further, the numerical value setting is a setting in a case in which the period of one frame is equally distributed to the red image display period (Tw+Tred+Twr=2.78 ms), the green image display period (Tw+Tgreen+Twg=2.78 ms), and the blue image display period (Tw+Tblue+Twb=2.78 ms).

In the above setting, by setting the delay time Td2 to 1.20 ms≤Td2≤1.58 ms, or 3.98 ms≤Td2≤4.36 ms, or 6.76 ms≤Td2≤7.14 ms, the sum Tsum of the overlap lighting period can be set to =0 ms (minimum value). Therefore, the two or more light sources are prevented from being turned on at the same time at any time.

In the above description, the period of one frame is equally distributed to the red, green, and blue display periods, but the present invention is not limited thereto, and even when the period of one frame is equally distributed to red, green, and blue, it is possible to set the sum Tsum of the overlap lighting period to =0 ms (minimum value). Further, the panel adjustment period is added to the panel drive period of red and blue image display, but the panel adjustment period may be added to the panel drive period of image display of at least one of red, green and blue.

Further, the panel adjustment period is added after the lighting period of the light source of each color light, but the present invention is not limited thereto, and the panel adjustment period may be added before the lighting period of the light source of each color light or may be added before and after the lighting period of the light source of each color light.

Further, the length Twait of the standby period of the panel unit is set to be equal to or larger than the maximum value Tlight of the length of the light source lighting time, but the present invention is not limited thereto. As described above in the second embodiment, the length of at least one lighting period may be larger than the length of the standby period of the panel unit.

According to the fourth embodiment, it is possible to provide the binocular HMD capable of suppressing the peak current for the light source driving or the continuation of the peak current even in a case in which the length of the standby period of the panel unit associated with each color image display differs depending on each color.

Fifth Embodiment

In the first to fourth embodiments, the right eye image display unit 10R and the left eye image display unit 10L include the light source units 110R and 110L, but in a fifth embodiment, the right eye image display unit 10R and the left eye image display unit 10L share the light source unit 110. Accordingly, it is possible to reduce the size of the binocular HMD 1.

Figure 14:
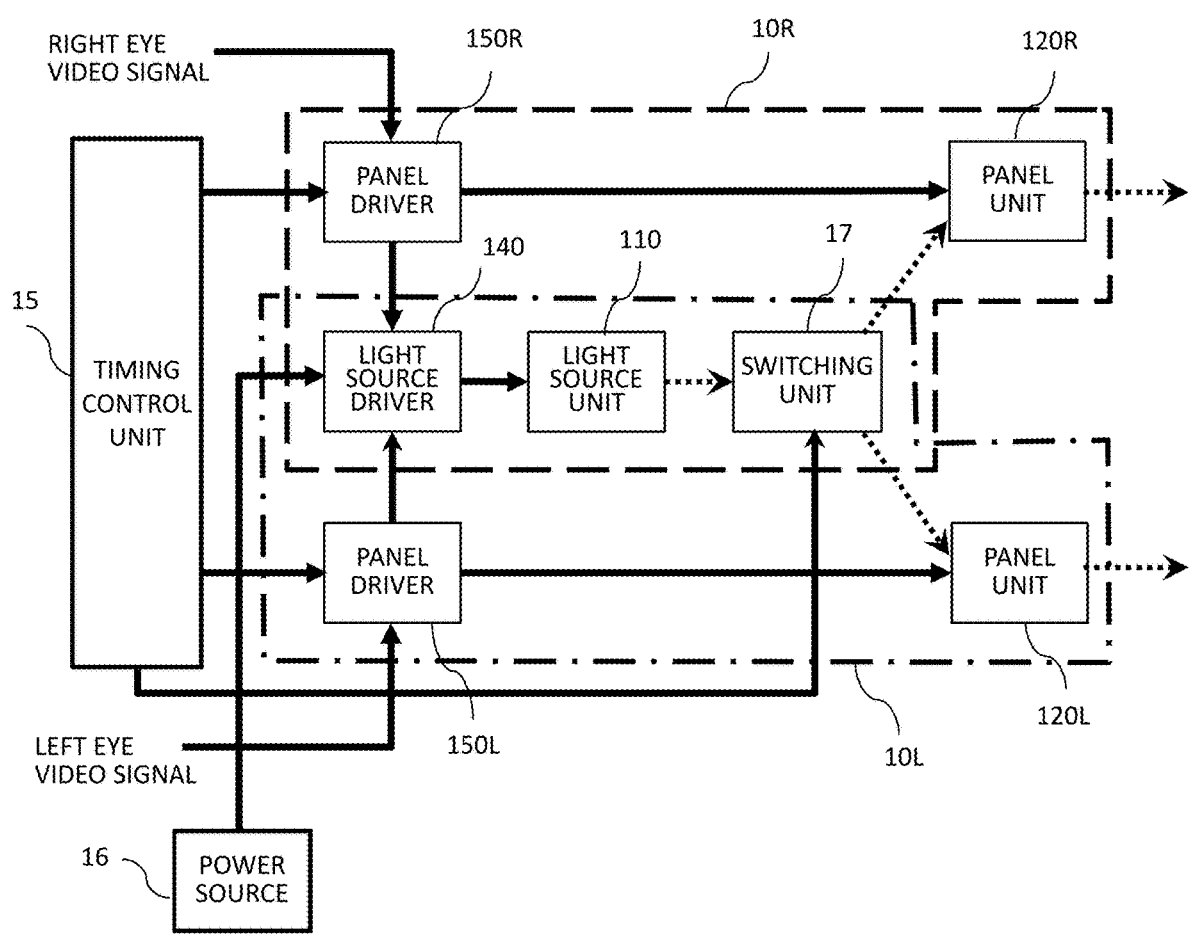
FIG. 14 is a diagram illustrating an example of a control block of a binocular HMD 1 (a fifth embodiment)

FIG. 14 is a diagram illustrating an example of a control block of the binocular HMD 1 according to the present embodiment. The binocular HMD 1 includes a right eye image display unit 10R, a left eye image display unit 10L, a timing control unit 15, and a power source 16. Here, the right eye image display unit 10R and the left eye image display unit 10L share the light source unit 110 And the light source driver 140, and a switching unit 17 may be further installed. The timing control unit 15 transmits a right eye panel unit drive trigger signal and a left eye panel unit drive trigger signal to the right eye panel driver 150R and the left eye panel driver 150L, and transmits a switching unit control signal to the switching unit 17. The right eye panel driver 150R and the left eye panel driver 150L transmit a light source unit drive trigger signal to the light source driver 140.

The light emitted from the light source unit 110 enters the switching unit 17. In response to the switching unit control signal received from the timing control unit 15, the switching unit 17 is connected to either of the right eye panel unit 120R and the left eye panel unit 120L, or both of the right eye panel unit 120R and the left eye panel unit 120L so that the light incident from the light source unit 110 is emitted to one of the right eye panel unit 120R and the left eye panel unit 120L or both of the right eye panel unit 120R and the left eye panel unit 120L. The light source unit 110 has the configuration of 110A or 110B illustrated in FIG. 3A or FIG. 3B.

Figure 15A:
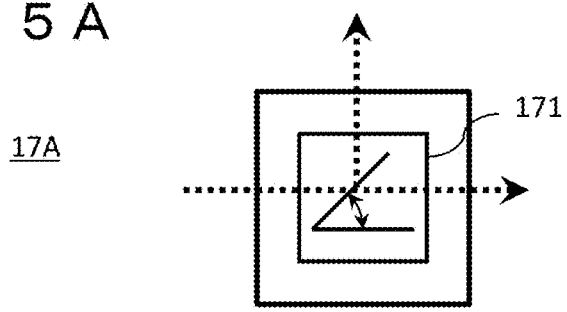
FIGS. 15A to 15C are views illustrating several configuration examples of a switching unit 17.
Figure 15B:
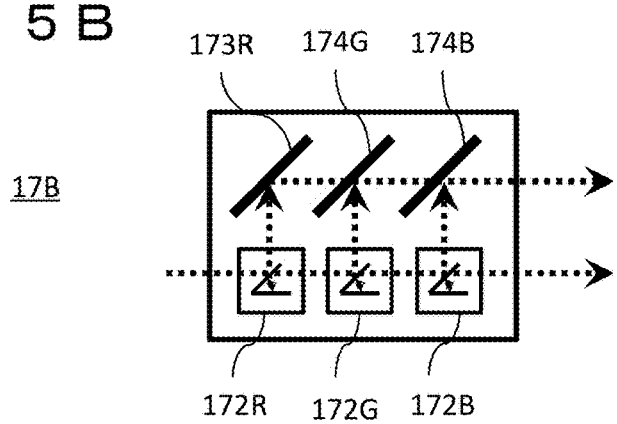
Figure 15C:
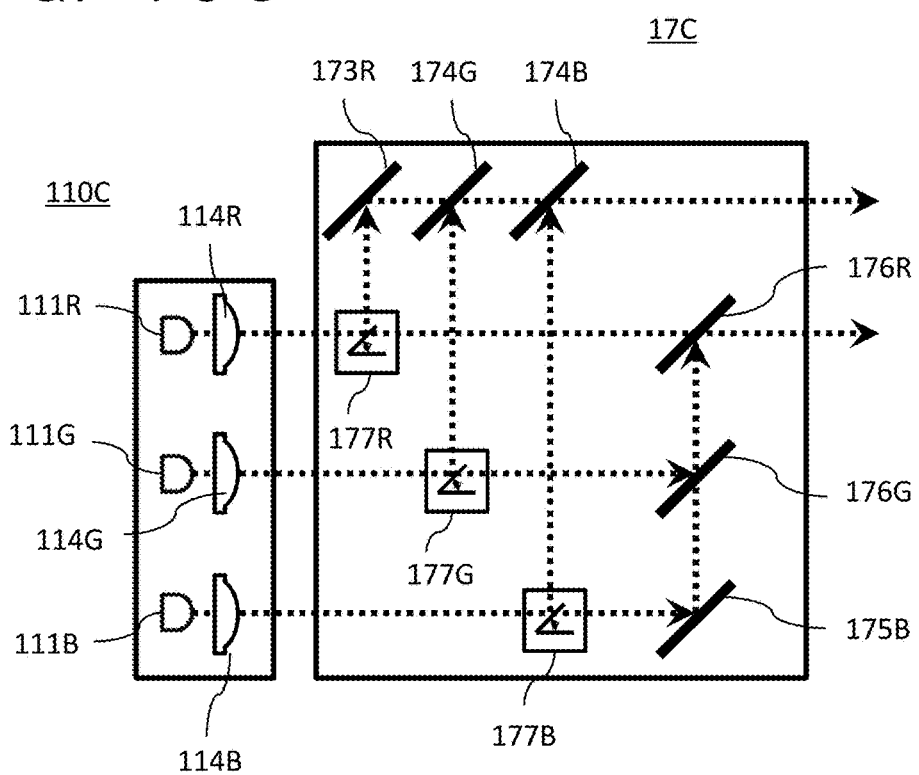

FIGS. 15A to 15C are diagrams illustrating several configuration examples of the switching unit 17. A switching unit 17A illustrated in FIG. 15A includes a switching mirror 171, and transmits or reflects all of light incident from the light source unit 110 or transmits or reflects part of light incident from the light source unit 110 in response to the switching unit control signal received from the timing control unit 15. In a case in which all of the light incident from the light source unit 110 is transmitted or reflected, for example, a movable mirror is preferably used as the switching mirror 171. Further, in a case in which part of the light incident from the light source unit 110 is reflected and reflected, for example, a movable mirror and a movable beam splitter are preferably combined and used as the switching mirror 171. With this configuration, it is possible to perform switching of whether all light emitted from the light source unit 110 is emitted to the right eye panel unit 120R or the left eye panel unit 120L or emitted to both the right eye panel unit 120R and the left eye panel unit 120.

The switching unit 17B illustrated in FIG. 15B includes switching mirrors 172R, 172G, 172B, mirror 173R, and dichroic mirrors 174G and 174B.

The switching mirror 172R transmits all of the green light and the blue light, and transmits or reflects all or part of the red light incident from the light source unit 110 in accordance with the switching unit control signal received from the timing control unit 15. The switching mirror 172G transmits all of the red light and the blue light, and transmits or reflects all or part of the green light incident from the switching mirror 172R in accordance with the switching unit control signal received from the timing control unit 15. The switching mirror 172B transmits all of the red light and the green light, and transmits or reflects all or part of the blue light incident from the switching mirror 172G in accordance with the switching unit control signal received from the timing control unit 15.

The mirror 173R reflects the red light. The dichroic mirror 174G transmits the red light and reflects the green light. The dichroic mirror 174B transmits the red light and the green light and reflects the blue light. With this configuration, the switching can be performed so that all of the red, green, and blue lights emitted from the light source unit 110 are emitted to the right eye panel unit 120R or the left eye panel unit 120L for each color or emitted to both of the right eye panel unit 120R or the left eye panel unit 120L.

FIG. 15C illustrates a configuration of a switching unit 17C together with a light source unit 110C. The light source unit 110C includes light sources 111R, 111G, and 111B and light collecting lens 114R, 114G, and 114B. The switching unit 17C includes switching mirrors 177R, 177G, and 177B, mirrors 173R and 175B, and dichroic mirrors 174G, 174B, 176R, and 176G.

The lights emitted from the light sources 111R, 111G, and 111B are collected by the light collecting lenses 114R, 114G, and 114B, respectively, and are emitted from the light source unit 110C. According to the switching unit control signal received from the timing control unit 15, the switching mirrors 177R, 177G, and 177B transmit, reflect, or partially transmit a part of the light incident from the light source unit 110C. The mirror 175B reflects the blue light. The dichroic mirror 176G transmits the blue light and reflects the green light. The dichroic mirror 176R transmits the red light and reflects the green light and the blue light. With this configuration, the switching can be performed so that all of the red, green, and blue lights emitted from the light source unit 110C are emitted to the right eye panel unit 120R or the left eye panel unit 120L for each color or emitted to both of the right eye panel unit 120R or the left eye panel unit 120L.

Figure 16:
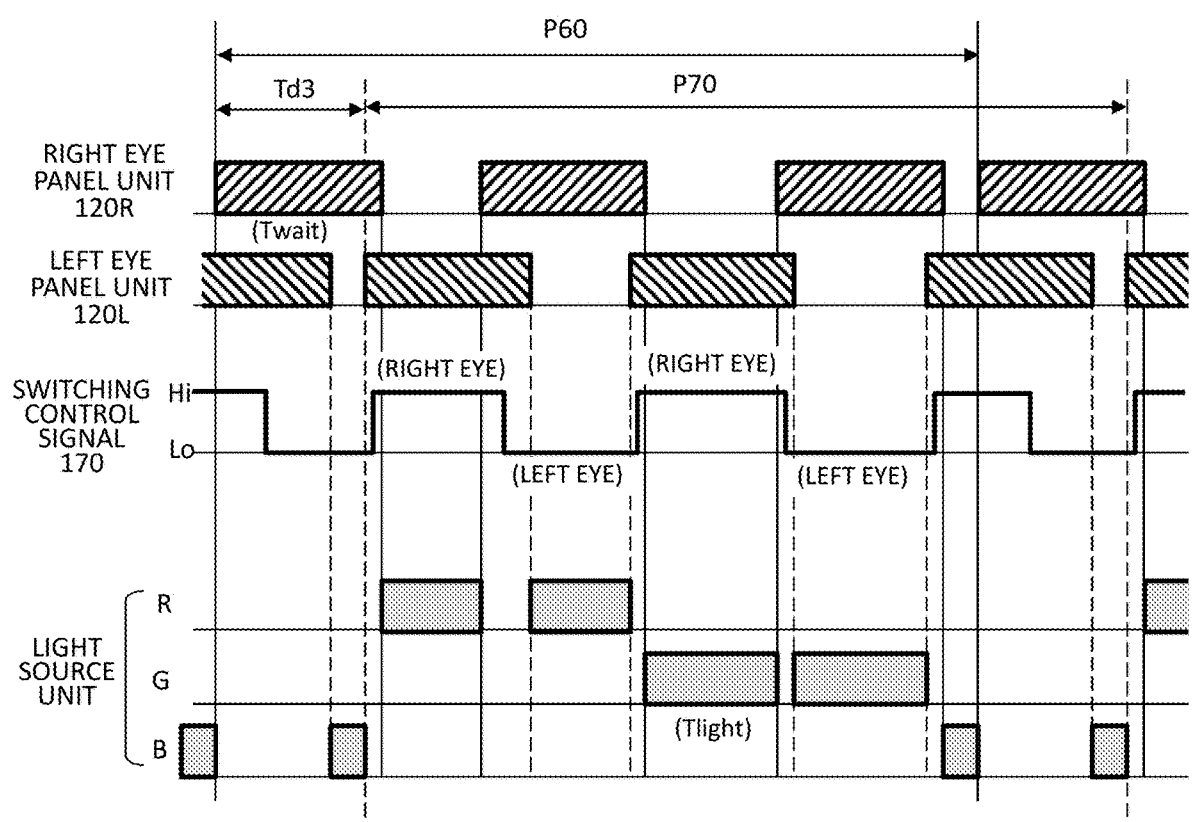
FIG. 16 is a diagram illustrating an image display operation in a fifth embodiment.

FIG. 16 is a diagram illustrating an example of a time sequence in which the two image display units 10 in the present embodiment display the images. A period P60 is a period of one frame of the right eye image display unit 10R, and a period P70 is a period of one frame of the left eye image display unit 10L. In the present example, the maximum length Tlight of the lighting period in which the image of each color is displayed is set to be smaller than the length Twait of the standby period of the panel unit associated with each color image display (Tlight<Twait). The timing control unit 15 selects a delay time Td 3 of the period P60 and the period P70 so that the sum Tsum of the overlap lighting period in which both the right eye panel unit 120R and the left eye panel unit 120 L are illuminated at the same time becomes 0. This condition is identical to that indicated by Formula (1a) or Formula (1b).

The switching unit 17A of FIG. 15A is used as the switching unit 17. The timing control unit 15 transmits a switching unit control signal 170 to the switching unit 17A.

The switching unit control signal 170 is a signal for indicating one of the right eye panel unit 120R and the left eye panel unit 120L to which the light incident on the switching unit 17A is emitted. In FIG. 16, when the signal level is Hi, all lights are emitted to the right eye panel unit 120R, and when the signal level is Lo, all lights are emitted to the left eye panel unit 120L.

In other words, the timing control unit 15 transmits the switching unit control signal 170 to the switching unit 17A, and performs control such that the light incident from the light source unit 110 is emitted to the right eye panel unit 120R in the period in which the right eye panel unit 120R displays the image, and light incident from the light source unit 110 is emitted to the left eye panel unit 120L in the period in which the left eye panel unit 120L displays the image.

Accordingly, by using the light emitted from the common light source unit 110, the right eye image light can be generated by the right eye image display unit 10R, and the left eye image light can be generated by the left eye image display unit 10L.

As the switching unit 17, the switching units 17B and 17C illustrated in FIG. 15B and FIG. 15C can also be used. In this case, the optical path is switched by the switching mirrors 172R and 177R in the period in which the red light source is turned on, the optical path is switched by the switching mirrors 172G and 177G in the period in which the green light source is turned on, and the optical path is switched by the switching mirrors 172B and 177B in the period in which the blue light source is turned on.

In the above example, the maximum length Tlight of the lighting period in which the image of each color is displayed is set to be smaller than the length Twait of the standby period of the panel unit associated with each color image display, but the present invention is not limited thereto, and the length Tlight of the lighting period in which images of one or more colors are displayed may be equal to or larger than the length Twait of the standby period of the panel unit associated with each color image display (Tlight≥Twait). In this case, since the sum Tsum of the overlap lighting period is not 0, there is a period in which both the right eye panel unit 120R and the left eye panel unit 120L are simultaneously illuminated by the common light source unit 110.

As a first case, there are cases in which there is a period (same color simultaneous illumination period) in which both the right eye panel unit 120R and the left eye panel unit 120L are simultaneously illuminated with the same color, but there is no period in which the right eye panel unit 120R and the left eye panel unit 120L are simultaneously illuminated with different colors. In this case, for example, the switching unit 17A can be used as the switching unit 17. In the same color simultaneous illumination period, the light source driver 140 receives a light source unit drive trigger signal for turning on the light source from both the right eye panel driver 150R and the left eye panel driver 150L. The light source driver 140 transmits a light source drive signal for driving the light source installed in the light source unit 110 with a current by which a sum of light quantities illuminating both the right eye panel unit 120R and the left eye panel unit 120L can be output to the light source unit 110. Further, the timing control unit 15 transmits a switching unit control signal for giving an instruction to transmit or reflect part of the light incident from the light source unit 110 to the switching unit 17A. The switching units 17B and 17C can also be used as the switching unit 17.

In a second case, there are cases in which there is a period (different colors simultaneous illumination period) in which both the right eye panel unit 120R and the left eye panel unit 120L are simultaneously illuminated with different colors. In this case, the switching units 17B and 17C can be used as the switching unit 17. In the different colors simultaneous illumination period, the light source driver 140 receives a light source unit drive trigger signal for turning on the light source from both the right eye panel driver 150R and the left eye panel driver 150L. The light source driver 140 transmits a light source drive signal for turning on the light source of the corresponding color to the light source unit 110 on the basis of the light source unit drive trigger signal. Further, the timing control unit 15 transmits a switching unit control signal to the switching unit 17 so that light of a predetermined color is emitted to a predetermined panel unit out of the right eye panel unit 120R and the left eye panel unit 120L.

According to the fifth embodiment, the light source unit 110 can be shared by the right eye image display unit 10R and the left eye image display unit 10L, and the size of the binocular HMD 1 (image display device) can be reduced.

The embodiments of the present invention have been described above, but the present invention is not limited to the above-described embodiments, but includes various modified examples. For example, the above-described embodiments have been described in detail in order to facilitate understanding of the present invention and are not necessarily limited to those having all the components described above. It is possible to replace a part of the configuration of an embodiment with a configuration of another embodiment, and it is also possible to add a configuration of another embodiment to a configuration of an embodiment. It is also possible to perform addition, deletion, and replacement of another configuration on a part of the configuration of each embodiment.

In the embodiments, the binocular head mounted display (HMD) has been described, but the invention is not limited thereto, and any image display device that displays two images in parallel is included in the scope of the present invention.

What is claimed is:

1. An image display device that displays a first image and a second image in parallel, comprising:
    a light source unit;
    a first panel unit which is illuminated by light emitted from the light source unit, and generates and displays the first image;
    a second panel unit which is illuminated by light emitted from the light source unit and generates and displays the second image;
    a timing control unit that controls operation timings of the light source unit, the first panel unit, and the second panel unit,
    wherein a period of one frame of the first image displayed by the first panel unit includes a standby period in which the first panel unit is not illuminated by the light from the light source unit for image generation preparation and a lighting period in which the first panel unit is illuminated by the light from the light source unit,
    wherein a period of one frame of the second image displayed by the second panel unit includes a standby period in which the second panel unit is not illuminated by the light from the light source unit for image generation preparation and a lighting period in which the second panel unit is illuminated by the light from the light source unit, and
    wherein the timing control unit performs control such that the period of one frame of the first image displayed by the first panel unit and the period of one frame of the second image displayed by the second panel unit overlap and frame start times of the respective periods are shifted from each other by a predetermined delay time Td,
    wherein the timing control unit sets the delay time Td so that a sum Tsum of overlap lighting periods in which a lighting period in which the light source unit illuminates the first panel unit and a lighting period in which the light source unit illuminates the second panel unit overlaps in the period of one frame of the first image displayed by the first panel unit is a minimum.

2. The image display device according to claim 1, further comprising:
    a first panel driver that receives a first control signal from the timing control unit and drives the first panel unit in synchronization with the first control signal; and
    a second panel driver that receives a second control signal from the timing control unit and drives the second panel unit in synchronization with the second control signal.

3. The image display device according to claim 1,
    wherein the timing control unit receives a first video signal and a second video signal and generates a third video signal and a fourth video signal obtained by shifting timings of the first video signal and the second video signal by the predetermined delay time Td, and
    the image display device further comprises:
    the first panel driver that receives the third video signal and drives the first panel unit in synchronization with the third video signal; and
    the second panel driver that receives the fourth video signal and driving the second panel unit in synchronization with the fourth video signal.

4. The image display device according to claim 1,
    wherein the timing control unit sets the delay time Td so that the sum Tsum of the overlap lighting periods is 0.

5. The image display device according to claim 1, further comprising,
    a power source in which a current boosting unit including a capacitor of a predetermined capacity is connected to a main power source unit in order to supply a current to the light source unit,
    wherein, when a time until a voltage of the power source decreases by driving of the light source unit, and a predetermined current is unable to be supplied to the light source unit is indicated by a time limit Tlimit,
    the timing control unit sets the delay time Td so that the sum Tsum of the overlap lighting periods of the light source unit is equal to or less than the time limit Tlimit.

6. The image display device according to claim 1,
    wherein the period of one frame of the first image displayed by the first panel unit and the period of one frame of the second image displayed by the second panel unit are divided into a plurality of sub frame periods in order to display images of a plurality of colors sequentially,
    each of the sub frame periods has a standby period of the first panel unit or the second panel unit and a lighting period of the light source unit,
    a time sequence of the period of one frame of the first image displayed by the first panel unit is identical to a time sequence of the period of one frame of the second image displayed by the second panel unit,
    lengths Twait of the standby periods of the first panel unit or the second panel unit in the respective sub frames are identical, and
    wherein a length of the lighting period in at least one sub frame period is different from a length of the lighting period in another sub frame period.

7. An image display device that displays a first image and a second image in parallel, comprising:
    a light source unit;
    a first panel unit which is illuminated by light emitted from the light source unit, and generates and displays the first image;
    a second panel unit which is illuminated by light emitted from the light source unit and generates and displays the second image; and
    a timing control unit that controls operation timings of the light source unit, the first panel unit, and the second panel unit,
    wherein a period of one frame of the first image displayed by the first panel unit includes a standby period in which the first panel unit is not illuminated by the light from the light source unit for image generation preparation and a lighting period in which the first panel unit is illuminated by the light from the light source unit, wherein a period of one frame of the second image displayed by the second panel unit includes a standby period in which the second panel unit is not illuminated by the light from the light source unit for image generation preparation and a lighting period in which the second panel unit is illuminated by the light from the light source unit, wherein the timing control unit performs control such that the period of one frame of the first image displayed by the first panel unit and the period of one frame of the second image displayed by the second panel unit overlap and frame start times of the respective periods are shifted from each other by a predetermined delay time Td, wherein the period of one frame of the first image displayed by the first panel unit and the period of one frame of the second image displayed by the second panel unit are divided into a plurality of sub frame periods in order to display images of a plurality of colors sequentially, wherein each of the sub frame periods has a standby period of the first panel unit or the second panel unit and a lighting period of the light source unit, wherein a time sequence of the period of one frame of the first image displayed by the first panel unit is identical to a time sequence of the period of one frame of the second image displayed by the second panel unit, and wherein lengths Twait of the standby periods of the first panel unit or the second panel unit in the respective sub frames are identical, wherein, when the length of the period of one frame of the first image displayed by the first panel unit is indicated by Tframe, a length of a longest lighting period among the light source periods of the light source unit in the respective sub frames is indicated by Tlight, and a length Twait of standby period≥Tlight, and wherein the timing control unit sets the delay time Td to satisfy $$Tlight \leq Td \leq Twait, \text{ or}$$

$$Tframe-Twait \leq Td \leq Tframe-Tlight.$$

8. An image display device that displays a first image and a second image in parallel, comprising:

a light source unit;

a first panel unit which is illuminated by light emitted from the light source unit, and generates and displays the first image;

a second panel unit which is illuminated by light emitted from the light source unit and generates and displays the second image; and a timing control unit that controls operation timings of the light source unit, the first panel unit, and the second panel unit, wherein a period of one frame of the first image displayed by the first panel unit includes a standby period in which the first panel unit is not illuminated by the light from the light source unit for image generation preparation and a lighting period in which the first panel unit is illuminated by the light from the light source unit, wherein a period of one frame of the second image displayed by the second panel unit includes a standby period in which the second panel unit is not illuminated by the light from the light source unit for image generation preparation and a lighting period in which the second panel unit is illuminated by the light from the light source unit, wherein the timing control unit performs control such that the period of one frame of the first image displayed by the first panel unit and the period of one frame of the second image displayed by the second panel unit overlap and frame start times of the respective periods are shifted from each other by a predetermined delay time Td, wherein the period of one frame of the first image displayed by the first panel unit and the period of one frame of the second image displayed by the second panel unit are divided into a plurality of sub frame periods in order to display images of a plurality of colors sequentially, wherein each of the sub frame periods has a standby period of the first panel unit or the second panel unit and a lighting period of the light source unit, wherein a time sequence of the period of one frame of the first image displayed by the first panel unit is identical to a time sequence of the period of one frame of the second image displayed by the second panel unit, wherein lengths Twait of the standby periods of the first panel unit or the second panel unit in the respective sub frames are identical, wherein, when the length of the period of one frame of the first image displayed by the first panel unit is indicated by Tframe, a length of a longest lighting period among the light source periods of the light source unit in the respective sub frames is indicated by Tlight, a length of a shortest lighting period is indicated by Tlight0, and a length Twait of standby period≥Tlight0 and length Twait of standby period≤Tlight, and wherein the timing control unit sets the delay time Td to satisfy $$Td=Twait, \text{ or}$$

$$Td=Tframe-Twait.$$

9. An image display device that displays a first image and a second image in parallel, comprising:

a light source unit;

a first panel unit which is illuminated by light emitted from the light source unit, and generates and displays the first image;

a second panel unit which is illuminated by light emitted from the light source unit and generates and displays the second image; and a timing control unit that controls operation timings of the light source unit, the first panel unit, and the second panel unit;

wherein a period of one frame of the first image displayed by the first panel unit includes a standby period in which the first panel unit is not illuminated by the light from the light source unit for image generation preparation and a lighting period in which the first panel unit is illuminated by the light from the light source unit, wherein a period of one frame of the second image displayed by the second panel unit includes a standby period in which the second panel unit is not illuminated by the light from the light source unit for image generation preparation and a lighting period in which the second panel unit is illuminated by the light from the light source unit, wherein the timing control unit performs control such that the period of one frame of the first image displayed by the first panel unit and the period of one frame of the second image displayed by the second panel unit overlap and frame start times of the respective periods are shifted from each other by a predetermined delay time Td, wherein the period of one frame of the first image displayed by the first panel unit and the period of one frame of the second image displayed by the second panel unit are divided into a plurality of sub frame periods in order to display images of a plurality of colors sequentially, wherein each of the sub frame periods has a standby period of the first panel unit or the second panel unit and a lighting period of the light source unit, wherein a time sequence of the period of one frame of the first image displayed by the first panel unit is identical to a time sequence of the period of one frame of the second image displayed by the second panel unit, wherein lengths Twait of the standby periods of the first panel unit or the second panel unit in the respective sub frames are identical, wherein, when a length of a shortest lighting period among the lighting periods of the light source units in the respective sub frames is indicated by Tlight0, and a length Twait of the standby period≤Tlight0, and wherein the timing control unit sets the delay time Td to satisfy $T\text{wait} \leq Td \leq T\text{light}0$, or $T\text{frame} - T\text{light}0 \leq Td \leq T\text{frame} - T\text{wait}$.

10. The image display device according to claim 1,
wherein the light source unit comprises a plurality of light sources that emit lights of different colors, and
the timing control unit controls the light source unit such that there is a lighting period in which the second panel unit is illuminated by light from a light source of a color different from a first color before and after the first panel unit is illuminated by light from a light source of the first color.

11. The image display device according to claim 1,
wherein the light source unit comprises a first light source unit that illuminates the first panel unit and a second light source unit that illuminates the second panel unit.

12. An image display device that displays a first image and a second image in parallel, comprising:

a light source unit;
a first panel unit which is illuminated by light emitted from the light source unit, and generates and displays the first image;
a second panel unit which is illuminated by light emitted from the light source unit and generates and displays the second image;
a timing control unit that controls operation timings of the light source unit, the first panel unit, and the second panel unit; and
a switching unit that switches an emission direction of the light source unit,
wherein a period of one frame of the first image displayed by the first panel unit includes a standby period in which the first panel unit is not illuminated by the light from the light source unit for image generation preparation and a lighting period in which the first panel unit is illuminated by the light from the light source unit,
wherein a period of one frame of the second image displayed by the second panel unit includes a standby period in which the second panel unit is not illuminated by the light from the light source unit for image generation preparation and a lighting period in which the second panel unit is illuminated by the light from the light source unit,
wherein the timing control unit performs control such that the period of one frame of the first image displayed by the first panel unit and the period of one frame of the second image displayed by the second panel unit overlap and frame start times of the respective periods are shifted from each other by a predetermined delay time Td, and
wherein the timing control unit controls the switching unit such that both the first panel unit and the second panel unit are illuminated by the light source unit.

13. A binocular head mounted display including the image display device according to claim 1, comprising:
a first wave guide unit that guides a first image generated by the first panel unit in the image display device to a right eye of a user;
a second wave guide unit that guides a second image generated by the second panel unit in the image display device to a left eye of the user; and
a holding unit that holds the image display device, the first wave guide unit, and the second wave guide unit.

* * * * *